(12) United States Patent
Rico Alvarino et al.

(10) Patent No.: US 11,950,252 B2
(45) Date of Patent: Apr. 2, 2024

(54) EARLY TERMINATION OF UPLINK COMMUNICATION REPETITIONS WITH MULTIPLE TRANSPORT BLOCKS

(71) Applicant: QUALCOMM Incorporated, San Diego, CA (US)

(72) Inventors: Alberto Rico Alvarino, San Diego, CA (US); Mungal Singh Dhanda, Slough (GB); Ayan Sengupta, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 17/360,647

(22) Filed: Jun. 28, 2021

(65) Prior Publication Data
US 2022/0007412 A1    Jan. 6, 2022

Related U.S. Application Data

(60) Provisional application No. 63/047,432, filed on Jul. 2, 2020.

(51) Int. Cl.
| | |
|---|---|
| *H04W 72/23* | (2023.01) |
| *H04L 1/1867* | (2023.01) |
| *H04W 72/1268* | (2023.01) |

(52) U.S. Cl.
CPC ............ *H04W 72/23* (2023.01); *H04L 1/189* (2013.01); *H04L 1/1896* (2013.01); *H04W 72/1268* (2013.01)

(58) Field of Classification Search
CPC .. H04W 72/23; H04W 72/1268; H04L 1/189; H04L 1/1896; H04L 1/1657; H04L 1/1864; H04L 1/1822; H04L 1/1887
See application file for complete search history.

(56) References Cited

U.S. PATENT DOCUMENTS

| | | | |
|---|---|---|---|
| 2020/0389805 A1* | 12/2020 | Kim | .............. H04W 72/23 |
| 2021/0219329 A1 | 7/2021 | Zhou et al. | |

(Continued)

FOREIGN PATENT DOCUMENTS

| | | |
|---|---|---|
| KR | 20200018353 A | 2/2020 |
| WO | WO-2020068919 A1 | 4/2020 |

OTHER PUBLICATIONS

International Search Report and Written Opinion—PCT/US2021/039511—ISA/EPO—dated Oct. 22, 2021.

(Continued)

*Primary Examiner* — Mandish K Randhawa
(74) *Attorney, Agent, or Firm* — Kevin M. Donnelly; Holland & Hart LLP

(57) ABSTRACT

Methods, systems, and devices for wireless communications are described in which repetitions of communications may be configured for multi-transport block (TB) communications. A UE may determine that an acknowledgment of one or more initial repetitions of one or more TBs is received, and may cancel one or more subsequent repetitions of the acknowledged TB(s). The acknowledgment of the one or more initial repetitions may be provided by a base station in a new resource grant that provides an implicit acknowledgment of one or more TBs. In cases where multiple different TBs may be associated with the prior resource grant, the UE can determine to drop one or more repetitions after an implicit acknowledgment of a TB based on whether the resource grants are for a single TB or are for multiple TBs.

44 Claims, 23 Drawing Sheets

(56) References Cited

U.S. PATENT DOCUMENTS

2021/0368579 A1\* 11/2021 Mu ................... H04W 72/0446
2023/0124181 A1\* 4/2023 Liang ................... H04L 5/0094
370/329

OTHER PUBLICATIONS

Xiaomi Communications: "Discussion on the Scheduling of Multiple DL/UL TBs", 3GPP Draft, 3GPP TSG RAN WG1 Meeting #95, R1-1812900, 3rd Generation Partnership Project (3GPP), Mobile Competence Centre, 650, Route Des Lucioles, F-06921 Sophia-Antipolis Cedex, France, vol. Ran WG1, No. Spokane, USA, Nov. 12, 2018-Nov. 16, 2018, Nov. 11, 2018 (Nov. 11, 2018), XP051554864, 4 Pages, Retrieved from the Internet: URL: http://www.3gpp.org/ftp/Meetings%5F3GPP%5FSYNC/RAN1/Docs/R1%2D1812900%2Ezip. [retrieved on Nov. 11, 2018] figure 1 section 2.1 section 2.3.

\* cited by examiner

EARLY TERMINATION OF UPLINK COMMUNICATION REPETITIONS WITH MULTIPLE TRANSPORT BLOCKS

CROSS REFERENCE

The present Application for Patent claims the benefit of U.S. Provisional Patent Application No. 63/047,432 by Rico Alvarino et al., entitled "EARLY TERMINATION OF UPLINK COMMUNICATION REPETITIONS WITH MULTIPLE TRANSPORT BLOCKS," filed Jul. 2, 2020, assigned to the assignee hereof, and expressly incorporated by reference herein.

FIELD OF TECHNOLOGY

The following relates generally to wireless communications and more specifically to early termination of uplink communication repetitions with multiple transport blocks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may experience conditions in which wireless channels between the UE and a base station are subject to a relatively large amount of interference or experience a relatively large amount of attenuation. For example, a UE may be in a location (e.g., deep inside a building or factory) that is not conducive for good channel conditions between the UE and base station, and the likelihood of successful communications may be reduced relative to cases where channel conditions are better (e.g., when a UE is relatively close to a base station with a direct line of sight). In other cases, a UE may be bandwidth limited and only able to transmit using a relatively narrow channel bandwidth, which may also reduce the likelihood of successful communications. In such cases, the UE and base station may use coverage enhancement techniques, which help to offset relatively poor channel, narrow bandwidth, or both. One coverage enhancement technique is to provide multiple repetitions of a communication, which may allow a receiving device to combine multiple instances of a communication to enhance the likelihood of successfully decoding the communication. Such repetitions consume system resources (e.g., wireless resources and transmitter/receiver power), and techniques to enhance the efficiency of such systems are thus desirable.

SUMMARY

The described techniques relate to improved methods, systems, devices, and apparatuses that support early termination of uplink communication repetitions with multiple transport blocks (TBs). In accordance with various aspects, described techniques provide for an identification at a user equipment (UE) of an acknowledgment of one or more initial repetitions of one or more TBs, and cancellation of one or more subsequent repetitions of the acknowledged TB(s). In some cases, the acknowledgment of the one or more initial repetitions may be provided by a base station in a new resource grant that reallocates resources from a prior resource grant to a new transmission, and thus provides an implicit acknowledgment of the prior communication. In cases where multiple different TBs may be associated with the prior resource grant, the UE can determine to drop one or more repetitions after an implicit acknowledgment of a TB based on whether the resource grants are for a single TB or are for multiple TBs.

In some cases, implicit acknowledgment and associated repetition cancellation are not allowed when the UE is configured for multi-TB communications. In other cases, implicit acknowledgment and associated repetition cancellation are allowed when an initial and a new resource grant are each for a single TB, and repetition cancellation is not allowed if either resource grant is a multi-TB grant. In other cases, the UE may determine which TB of multiple TBs is acknowledged and may cancel repetitions of the acknowledged TBs based on one or more timing rules. The timing rules relate to an initial instance of a TB transmission and minimum timings from the initial instance, and also provide that the UE may continue to transmit acknowledged TBs in order to maintain phase continuity for a period of time based on when one or more unacknowledged TBs are transmitted.

A method of wireless communication at a UE is described. The method may include transmitting, to a base station, one or more repetitions of a first uplink communication based on a first resource grant received from the base station, receiving, from the base station, a second resource grant for a second uplink communication that at least partially overlaps with resources for one or more repetitions of the first uplink communication, and determining to cancel or to transmit one or more remaining repetitions of the first uplink communication based on the second resource grant providing an implicit acknowledgment of successful receipt of at least one transport block of the first uplink communication and based on whether one or more of the first resource grant or the second resource grant schedules multiple transport blocks.

An apparatus for wireless communication at a UE is described. The apparatus may include a processor, memory coupled with the processor, and instructions stored in the memory. The instructions may be executable by the processor to cause the apparatus to transmit, to a base station, one or more repetitions of a first uplink communication based on a first resource grant received from the base station, receive, from the base station, a second resource grant for a second uplink communication that at least partially overlaps with resources for one or more repetitions of the first uplink communication, and determine to cancel or to transmit one or more remaining repetitions of the first uplink communication based on the second resource grant providing an implicit acknowledgment of successful receipt of at least one transport block of the first uplink communication and based on whether one or more of the first resource grant or the second resource grant schedules multiple transport blocks.

Another apparatus for wireless communication at a UE is described. The apparatus may include means for transmitting, to a base station, one or more repetitions of a first uplink communication based on a first resource grant received from the base station, receiving, from the base station, a second resource grant for a second uplink communication that at least partially overlaps with resources for one or more repetitions of the first uplink communication, and determining to cancel or to transmit one or more remaining repetitions of the first uplink communication based on the second resource grant providing an implicit acknowledgment of successful receipt of at least one transport block of the first uplink communication and based on whether one or more of the first resource grant or the second resource grant schedules multiple transport blocks.

A non-transitory computer-readable medium storing code for wireless communication at a UE is described. The code may include instructions executable by a processor to transmit, to a base station, one or more repetitions of a first uplink communication based on a first resource grant received from the base station, receive, from the base station, a second resource grant for a second uplink communication that at least partially overlaps with resources for one or more repetitions of the first uplink communication, and determine to cancel or to transmit one or more remaining repetitions of the first uplink communication based on the second resource grant providing an implicit acknowledgment of successful receipt of at least one transport block of the first uplink communication and based on whether one or more of the first resource grant or the second resource grant schedules multiple transport blocks.

Some examples of the method, apparatuses, and non-transitory computer-readable medium described herein may further include operations, features, means, or instructions for receiving, from the base station, configuration information that enables resource grants for multiple transport blocks, where cancellation of repetitions based on implicit acknowledgment of transport blocks is disabled based on the configuration information that enables resource grants for multiple transport blocks, and where cancellation of repetitions based on implicit acknowledgment of transport blocks is enabled based on configuration information that disables resource grants for multiple transport blocks.

In some examples of the method, apparatuses, and non-transitory computer-readable medium described herein, the determining may include operations, features, means, or instructions for determining to transmit the one or more remaining repetitions of the first uplink communication based on the configuration information, and disregarding the second resource grant based on the determining to transmit the one or more remaining repetitions of the first uplink communication.

In some examples of the method, apparatuses, and non-transitory computer-readable medium described herein, the determining may include operations, features, means, or instructions for identifying that one or more of the first resource grant or the second resource grant schedules multiple transport blocks, and determining to transmit the one or more remaining repetitions of the first uplink communication based on the identifying.

In some examples of the method, apparatuses, and non-transitory computer-readable medium described herein, the determining may include operations, features, means, or instructions for identifying that each of the first resource grant and the second resource grant schedule a single transport block and that the second resource grant provides an acknowledgment of the transport block associated with the first resource grant, determining to cancel the one or more remaining repetitions of the first uplink communication based on the identifying, and transmitting one or more repetitions of the second uplink communication based on the second resource grant.

In some examples of the method, apparatuses, and non-transitory computer-readable medium described herein, the determining may include operations, features, means, or instructions for identifying that each of two or more transport blocks scheduled by the first resource grant is acknowledged by the base station based on the second resource grant, determining to cancel the one or more remaining repetitions of the first uplink communication based on the identifying, and transmitting one or more repetitions of the second uplink communication based on the second resource grant.

In some examples of the method, apparatuses, and non-transitory computer-readable medium described herein the two or more transport blocks scheduled by the first resource grant are each determined to be acknowledged by the base station based at least in part on the second resource grant indicating a second set of feedback process identifications (FPIs), wherein each FPI of the second set of FPIs either is not included in a first set of FPIs in the first resource grant, or is included in the first set of FPIs and have a different new data indicator.

In some examples of the method, apparatuses, and non-transitory computer-readable medium described herein, the determining further may include operations, features, means, or instructions for determining that the one or more repetitions of the second resource grant is scheduled to be transmitted after at least a threshold time period following a first repetition of the two or more transport blocks scheduled by the first resource grant.

In some examples of the method, apparatuses, and non-transitory computer-readable medium described herein, the determining may include operations, features, means, or instructions for identifying that at least a first transport block of a first set of transport blocks scheduled by the first resource grant is acknowledged based on the second resource grant, determining to cancel one or more remaining repetitions of the first transport block based on the identifying, and transmitting one or more repetitions of the second uplink communication based on the second resource grant, where the second uplink communication includes one or more repetitions of at least a second transport block of the first set of transport blocks that is unacknowledged by the base station.

In some examples of the method, apparatuses, and non-transitory computer-readable medium described herein, the first transport block is associated with a first feedback process identification and a first new data indicator value and the first transport block is determined to be acknowledged based on the second resource grant including the first feedback process identification with a different new data indicator than the first new data indicator value, or the first transport block is determined to be acknowledged based at least in part the first feedback process identification not being included in the second resource grant.

Some examples of the method, apparatuses, and non-transitory computer-readable medium described herein may further include operations, features, means, or instructions for delivering an acknowledgment indication for the first transport block from a physical layer of a protocol stack at the UE to a higher layer of the protocol stack.

In some examples of the method, apparatuses, and non-transitory computer-readable medium described herein, the determining to cancel the one or more remaining repetitions of the first transport block further may include operations, features, means, or instructions for determining a timing for transmitting a first repetition of the second transport block that is after at least a threshold time period following the second resource grant.

In some examples of the method, apparatuses, and non-transitory computer-readable medium described herein, the determining to cancel the one or more remaining repetitions of the first transport block further may include operations, features, means, or instructions for determining that the second uplink communication is to be transmitted using resources that overlap with the first uplink communication.

In some examples of the method, apparatuses, and non-transitory computer-readable medium described herein, the timing for cancelling the one or more remaining repetitions of the first uplink communication corresponds to a time period from a first instance available for transmission of the first transport block after receiving the second resource grant to a first uplink resource allocated by the second resource grant.

In some examples of the method, apparatuses, and non-transitory computer-readable medium described herein, the timing for cancelling the one or more remaining repetitions of the first uplink communication corresponds to a first instance available for transmission of the second transport block based on the second resource grant.

In some examples of the method, apparatuses, and non-transitory computer-readable medium described herein, the timing for cancelling the one or more remaining repetitions of the first uplink communication corresponds to a first instance available for transmission of the first transport block after the second resource grant when successful receipt of each transport block of the first uplink communication is acknowledged, or the timing for cancelling the one or more remaining repetitions of the first uplink communication corresponds to a first instance available for transmission of the second transport block based on the second resource grant when successful receipt of less than all transport blocks of the first uplink communication is acknowledged.

In some examples of the method, apparatuses, and non-transitory computer-readable medium described herein, the timing for cancelling the one or more remaining repetitions of the first uplink communication corresponds to a first instance available for transmission of the first transport block when successful receipt of the first transport block is acknowledged, and the timing for cancelling the one or more remaining repetitions of the first uplink communication corresponds to a first instance available for transmission of the second transport block based on the second resource grant when successful receipt of the first transport block is unacknowledged.

In some examples of the method, apparatuses, and non-transitory computer-readable medium described herein, the timing for cancelling the one or more remaining repetitions of the first uplink communication corresponds to a first instance available for transmission of the second transport block after a transmission of a latest transport block of the first uplink communication for which successful receipt is unacknowledged.

In some examples of the method, apparatuses, and non-transitory computer-readable medium described herein, the determining to cancel or to transmit the one or more remaining repetitions of the first uplink communication is further determined based on whether multiple transport blocks scheduled by the first resource grant are interleaved or are non-interleaved.

In some examples of the method, apparatuses, and non-transitory computer-readable medium described herein, the second resource grant for the second uplink communication at least partially overlaps in time with the resources for one or more repetitions of the first uplink communication.

A method of wireless communication at a base station is described. The method may include transmitting, to a UE a first resource grant for one or more repetitions of a first uplink communication to be transmitted by the UE, receiving, from the UE, one or more repetitions of the first uplink communication, determining to cancel one or more remaining repetitions of the first uplink communication based on successfully decoding at least a first transport block of the first uplink communication, and transmitting, to the UE, a second resource grant for a second uplink communication that at least partially overlaps with resources for one or more repetitions of the first uplink communication and provides an implicit acknowledgment of successful receipt of the first transport block, where the second resource grant indicates that the UE is to cancel further repetitions of the first transport block based on whether one or more of the first resource grant or the second resource grant schedules multiple transport blocks.

An apparatus for wireless communication at a base station is described. The apparatus may include a processor, memory coupled with the processor, and instructions stored in the memory. The instructions may be executable by the processor to cause the apparatus to transmit, to a UE a first resource grant for one or more repetitions of a first uplink communication to be transmitted by the UE, receive, from the UE, one or more repetitions of the first uplink communication, determine to cancel one or more remaining repetitions of the first uplink communication based on successfully decoding at least a first transport block of the first uplink communication, and transmit, to the UE, a second resource grant for a second uplink communication that at least partially overlaps with resources for one or more repetitions of the first uplink communication and provides an implicit acknowledgment of successful receipt of the first transport block, where the second resource grant indicates that the UE is to cancel further repetitions of the first transport block based on whether one or more of the first resource grant or the second resource grant schedules multiple transport blocks.

Another apparatus for wireless communication at a base station is described. The apparatus may include means for transmitting, to a UE a first resource grant for one or more repetitions of a first uplink communication to be transmitted by the UE, receiving, from the UE, one or more repetitions of the first uplink communication, determining to cancel one or more remaining repetitions of the first uplink communication based on successfully decoding at least a first transport block of the first uplink communication, and transmitting, to the UE, a second resource grant for a second uplink communication that at least partially overlaps with resources for one or more repetitions of the first uplink communication and provides an implicit acknowledgment of successful receipt of the first transport block, where the second resource grant indicates that the UE is to cancel further repetitions of the first transport block based on whether one or more of the first resource grant or the second resource grant schedules multiple transport blocks.

A non-transitory computer-readable medium storing code for wireless communication at a base station is described. The code may include instructions executable by a processor to transmit, to a UE a first resource grant for one or more repetitions of a first uplink communication to be transmitted by the UE, receive, from the UE, one or more repetitions of the first uplink communication, determine to cancel one or more remaining repetitions of the first uplink communication based on successfully decoding at least a first transport block of the first uplink communication, and transmit, to the UE, a second resource grant for a second uplink communication that at least partially overlaps with resources for one or more repetitions of the first uplink communication and provides an implicit acknowledgment of successful receipt of the first transport block, where the second resource grant indicates that the UE is to cancel further repetitions of the first transport block based on whether one or more of the first resource grant or the second resource grant schedules multiple transport blocks.

Some examples of the method, apparatuses, and non-transitory computer-readable medium described herein may further include operations, features, means, or instructions for transmitting, to the UE, configuration information that enables resource grants for multiple transport blocks, where cancellation of repetitions based on implicit acknowledgment of transport blocks is disabled based on the configuration information that enables resource grants for multiple transport blocks, and where cancellation of repetitions based on implicit acknowledgment of transport blocks is enabled based on configuration information that disables resource grants for multiple transport blocks.

Some examples of the method, apparatuses, and non-transitory computer-readable medium described herein may further include operations, features, means, or instructions for disregarding one or more further repetitions of the first transport block when one or more of the first resource grant or the second resource grant schedules multiple transport blocks.

Some examples of the method, apparatuses, and non-transitory computer-readable medium described herein may further include operations, features, means, or instructions for monitoring for the second uplink communication using at least a portion of resources of the one or more remaining repetitions of the first uplink communication based on the first resource grant and the second resource grant each scheduling a single transport block.

In some examples of the method, apparatuses, and non-transitory computer-readable medium described herein, the second resource grant is transmitted responsive to determining that each transport block of two or more transport blocks scheduled by the first resource grant are successfully decoded at the base station.

In some examples of the method, apparatuses, and non-transitory computer-readable medium described herein, the second resource grant provides an indication that each of the two or more transport blocks have been successfully decoded based on the second resource grant indicating a second set of feedback process identifications (FPIs), where each FPI of the second set of FPIs either is not included in a first set of FPIs in the first resource grant, or is included in the first set of FPIs and has a different new data indicator.

Some examples of the method, apparatuses, and non-transitory computer-readable medium described herein may further include operations, features, means, or instructions for determining resources for a first instance of one or more repetitions of the second resource grant based on a threshold time period following a first repetition of the two or more transport blocks scheduled by the first resource grant.

In some examples of the method, apparatuses, and non-transitory computer-readable medium described herein, the second resource grant provides an indication that the first transport block of a first set of transport blocks scheduled by the first resource grant has been successfully decoded, and where further repetitions of the first transport block are canceled and the UE continues to transmit one or more repetitions of a second transport block of the first set of transport blocks that are unacknowledged by the base station.

In some examples of the method, apparatuses, and non-transitory computer-readable medium described herein, the acknowledgment of successful decoding of the first transport block is indicated by a first feedback process identification and a first new data indicator value provided in the second resource grant, where the first transport block is indicated to be acknowledged when the second resource grant includes the first feedback process identification with a different new data indicator than the first new data indicator value, or when the second resource grant does not include the first feedback process identification.

Some examples of the method, apparatuses, and non-transitory computer-readable medium described herein may further include operations, features, means, or instructions for monitoring for a first repetition of the second uplink communication in an uplink resource that is after at least a threshold time period following the second resource grant.

Some examples of the method, apparatuses, and non-transitory computer-readable medium described herein may further include operations, features, means, or instructions for monitoring for a first repetition of the second uplink communication in an uplink resource that corresponds to a first instance available for transmission of the second uplink communication after the threshold time period following the second resource grant.

Some examples of the method, apparatuses, and non-transitory computer-readable medium described herein may further include operations, features, means, or instructions for monitoring for a first repetition of the second uplink communication in an uplink resource that corresponds to a first instance available for transmission of the second uplink communication based on the second resource grant.

Some examples of the method, apparatuses, and non-transitory computer-readable medium described herein may further include operations, features, means, or instructions for discontinuing monitoring for one or more repetitions of the first uplink communication in uplink resources starting at a first instance available for transmission of the first transport block after the second resource grant when successful receipt of each transport block of the first uplink communication is acknowledged, or monitoring for one or more repetitions of the first uplink communication up to a first instance available for transmission of the second transport block based on the second resource grant when successful receipt of less than all transport blocks of the first uplink communication is acknowledged.

Some examples of the method, apparatuses, and non-transitory computer-readable medium described herein may further include operations, features, means, or instructions for discontinuing monitoring for one or more repetitions of the first uplink communication in uplink resources starting at a first instance available for transmission of the first transport block following the second resource grant when successful receipt of the first transport block is acknowledged, and monitoring for one or more repetitions of the first uplink communication in uplink resources up to a first instance available for transmission of the second uplink communication based on the second resource grant when successful receipt of the first transport block is unacknowledged.

Some examples of the method, apparatuses, and non-transitory computer-readable medium described herein may further include operations, features, means, or instructions for monitoring for one or more repetitions of the first uplink communication up to a latest transport block of the first uplink communication for which successful receipt is unacknowledged, and discontinuing monitoring for the one or more repetitions of the first uplink communication starting after the latest transport block of the first uplink communication for which successful receipt is unacknowledged.

In some examples of the method, apparatuses, and non-transitory computer-readable medium described herein, the second resource grant for the second uplink communication at least partially overlaps in time with the resources for one or more repetitions of the first uplink communication.

DETAILED DESCRIPTION

Figure 1:
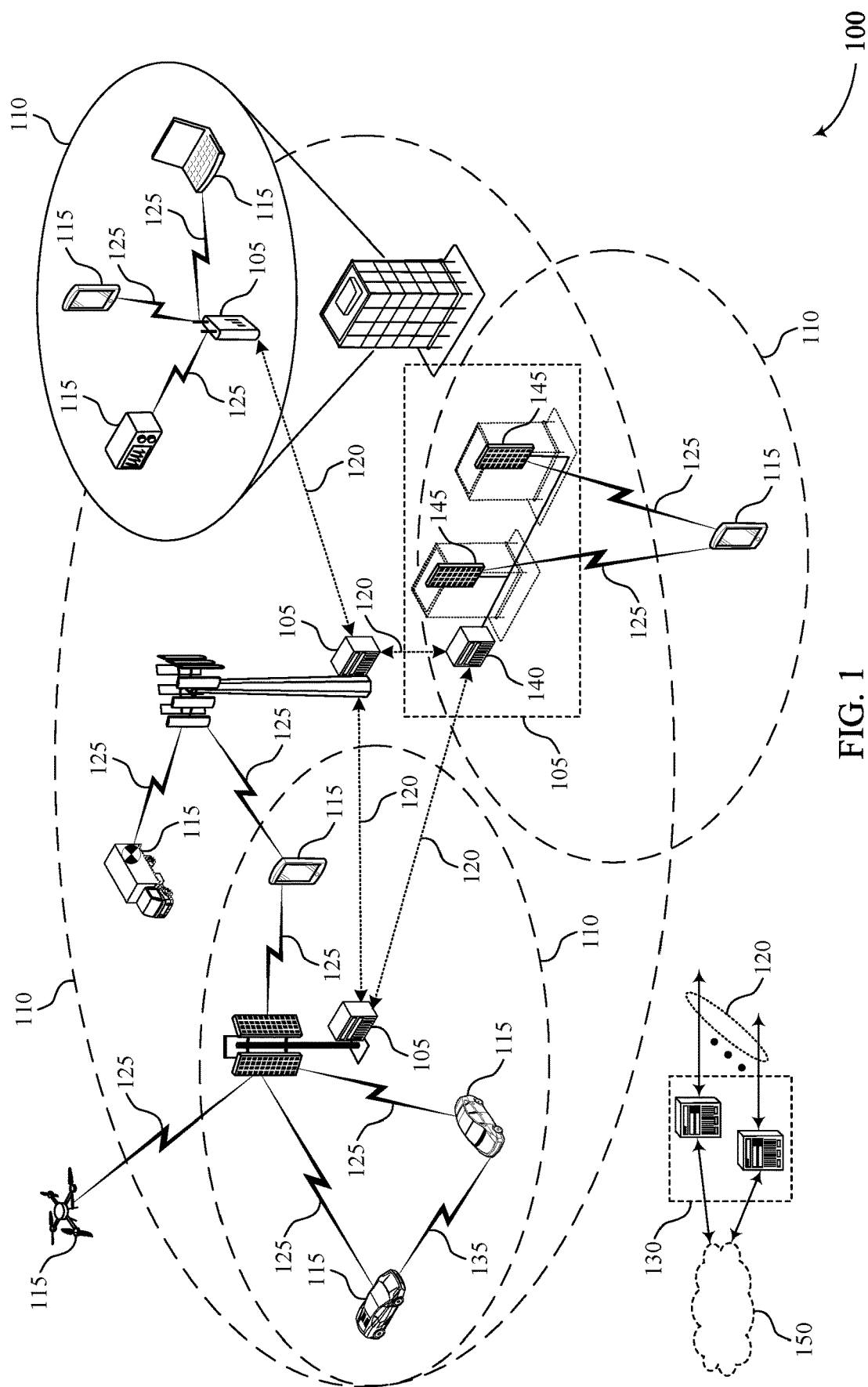
FIG. 1 illustrates an example of a system for wireless communications that supports early termination of uplink communication repetitions with multiple transport blocks (TBs) in accordance with aspects of the present disclosure.

As discussed herein, in some cases a user equipment (UE) may operate using one or more coverage enhancement techniques in order to enhance the likelihood of successful communications between the UE and a base station. Such techniques may be used in cases where the UE is subject to relatively poor channel conditions, where the UE is bandwidth limited, or both. Such a UE in some cases may be referred to as a bandwidth limited or coverage enhancement (BL/CE) UE. One coverage enhancement technique is to provide multiple repetitions of a communication, which may allow a receiving device to combine multiple instances of a communication to enhance the likelihood of successfully decoding the communication. Techniques as discussed herein provide enhanced efficiency in cases where repetitions of communications are used to enhance coverage, through allowance of early cancellation of one or more repetitions.

In various aspects described herein, techniques provide for an acknowledgment of one or more initial repetitions of one or more transport blocks (TBs) to be provided to a UE, which may then cancel one or more subsequent repetitions of the acknowledged TB(s). In some cases, a first resource grant may be provided to the UE that allocated resources for repetitions of two or more TBs. A base station that monitors for the repetitions of the TBs may determine that one or more of the TBs has been successfully decoded, and thus receipt of the TB(s) can be acknowledged (e.g., according to a hybrid automatic repeat request (HARQ) feedback procedure). Such an acknowledgment (ACK) may be provided to the UE, which may then determine that retransmissions of the associated TB are not necessary. In some cases, a TB may have an associated feedback process identification (e.g., a HARQ process ID), and the UE may maintain a list of feedback process IDs for which an ACK of an associated TB has not been received. In some cases, the base station may provide explicit feedback that indicates whether a TB has an ACK or a negative ACK (NACK), such as in HARQ ACK/NACK feedback that is provided by the base station to the UE. In such cases, the UE may unambiguously identify which feedback process IDs (and thus corresponding TBs) have an ACK and which have a NACK, and determine to retransmit or continue transmitting repetitions for TBs that have not been ACKed.

In other cases, a base station may provide an implicit ACK of one or more TBs through a new resource grant that may be provided in downlink control information (DCI) to the UE. For example, the first resource grant may provide resources for multiple repetitions of four different TBs. After transmitting one or more initial repetitions of the TBs, the UE may receive a second resource grant in DCI from the base station. The second resource grant may allocate uplink resources to the UE and indicate one or more different feedback process IDs, or one or more feedback process IDs that are the same as the first resource grant but that have a toggled new data indicator (NDI). Based on the different feedback process ID or toggled NDI of a same feedback process ID (indicating that a new TB is to be transmitted), the UE may determine that the initial TB(s) have been acknowledged by the base station. In various techniques as discussed herein, the UE can determine to drop one or more repetitions after an implicit acknowledgment of a TB based on whether the resource grants are for a single TB or are for multiple TBs.

In some cases, implicit acknowledgment and associated repetition cancellation are not allowed when the UE is configured for multi-TB communications. In such cases, the UE may continue to transmit repetitions in accordance with an initial resource grant irrespective of whether a DCI is received with a new resource grant for resources associated with the initial resource grant (i.e., the UE ignores the new resource grant).

In other cases, implicit acknowledgment and associated repetition cancellation are allowed when the UE is configured for multi-TB communications (e.g., when a BL/CE UE is configured with radio resource control (RRC) parameter 'multi-TB-UL-config'). In such cases, the UE may cancel one or more repetitions of a TB when an initial and a new resource grant are each for a single TB, and repetition cancellation is not allowed if either resource grant is a multi-TB grant. In other cases, the UE may determine which TB of multiple TBs is acknowledged, may cancel repetitions of the acknowledged TBs, and continue transmitting repetitions of unacknowledged TBs. In some cases, the cancellation of repetitions may be based on one or more timing rules. Such timing rules may relate to an initial instance of a TB transmission and minimum timings from the initial instance, and also provide that the UE may continue to transmit acknowledged TBs in order to maintain phase continuity for a period of time based on when one or more unacknowledged TBs are transmitted.

Various aspects of the subject matter described herein may be implemented to realize one or more of the following potential advantages. The techniques employed by the described UEs may provide benefits and enhancements to the operation of the UEs. For example, operations performed by the UEs may provide improvements to power consumption, latency, and reliability in receiving and transmitting multiple repetitions of a TB. Early termination of repetitions may allow a base station to reallocate associated resources and provide more efficient usage of available resources, which may also help to reduce latency in communications. Further, fewer repetition transmissions may allow for power savings at the UE. The described techniques may thus include features for improvements to reliability in communications and enhanced communications efficiency.

Aspects of the disclosure are initially described in the context of wireless communications systems. Various examples of TB repetitions and early termination techniques are then discussed. Aspects of the disclosure are further illustrated by and described with reference to apparatus diagrams, system diagrams, and flowcharts that relate to early termination of uplink communication repetitions with multiple TBs.

FIG. 1 illustrates an example of a wireless communications system 100 that supports early termination of uplink communication repetitions with multiple TBs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, one or more of the UEs 115 may use coverage enhancement techniques (e.g., for BL/CE UEs) in which multiple repetitions of communications may be transmitted. Further, such UEs 115 may be configured for multi-TB communications. In accordance with various aspects discussed herein, a UE may determine that an acknowledgment of one or more initial repetitions of one or more TBs is received, and may cancel one or more subsequent repetitions of the acknowledged TB(s). In some cases, the acknowledgment of the one or more initial repetitions may be provided by a base station 105 in a new resource grant that provides an implicit acknowledgment of one or more TBs. In cases where multiple different TBs may be associated with the prior resource grant, the UE 115 can determine to drop one or more repetitions after an implicit acknowledgment of a TB based on whether the resource grants are for a single TB or are for multiple TBs.

Figure 2:
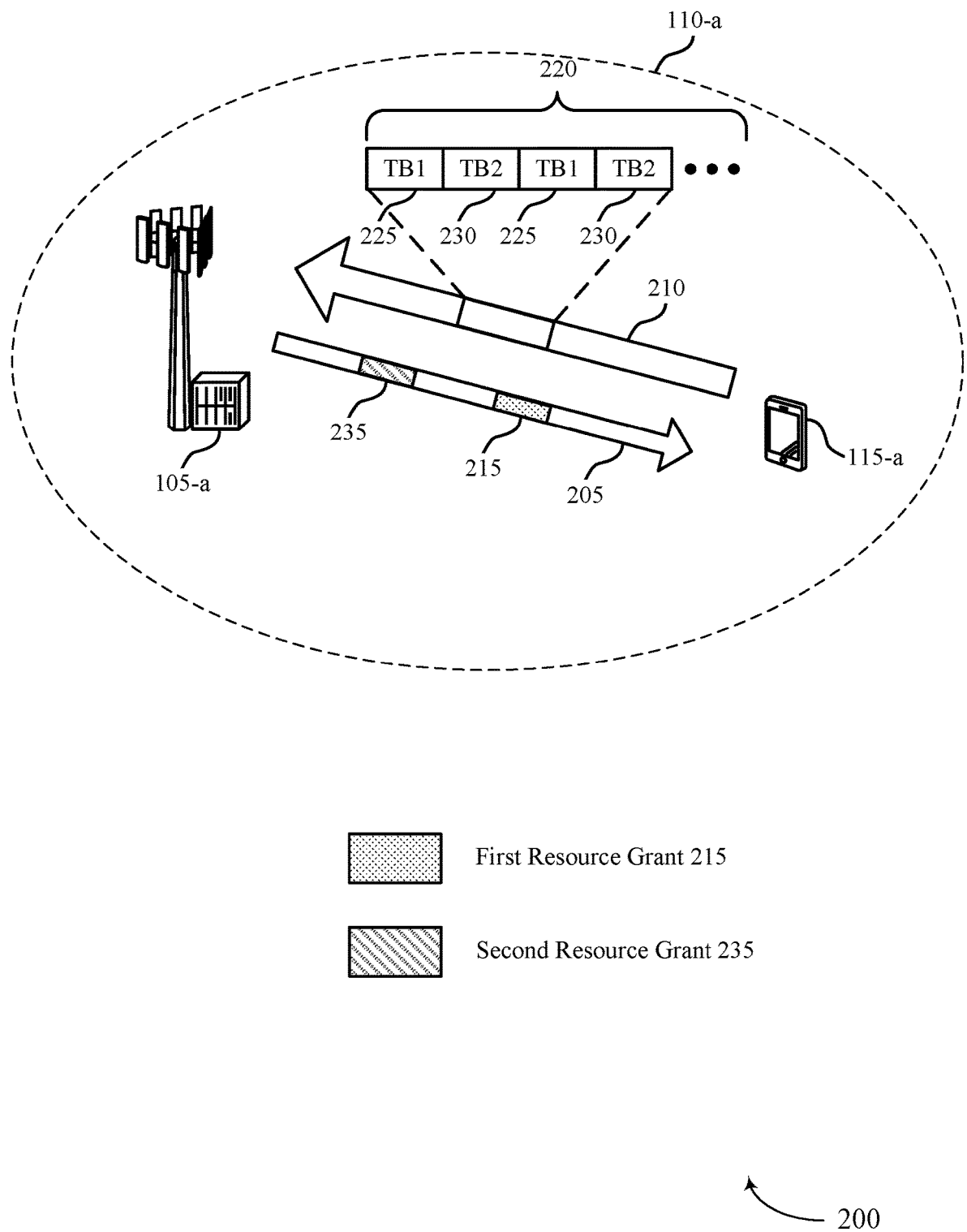
FIG. 2 illustrates an example of a portion of a wireless communications system that supports early termination of uplink communication repetitions with multiple TBs in accordance with aspects of the present disclosure.

FIG. 2 illustrates an example of a wireless communications system 200 that supports early termination of uplink communication repetitions with multiple TBs in accordance with aspects of the present disclosure. In some examples, wireless communications system 200 may implement aspects of wireless communications system 100. The wireless communications system 200 may include base station 105-a and UE 115-a which may be examples of a base station or UE described above with reference to FIG. 1. Base station 105-a and UE 115-a may communicate with one another within coverage area 110-a using downlink 205 and uplink 210 communications and using techniques described above with reference to FIG. 1. The wireless communications system 200 may provide for repetitions of certain communications in order to enhance the likelihood of successful receipt and decoding of the communications, and thereby enhance system reliability and efficiency.

In the example of FIG. 2, the base station 105-a may transmit and the UE 115-a may receive configuration information that enables or disables multi-TB resource grants (e.g., RRC signaling may be used to configure a UE with 'multi-TB-UL-config'). Further, the UE 115-a may operate to transmit multiple repetitions of a communication to the base station 105-a (e.g., based on an enabled coverage enhancement procedure). In this example, the base station 105-a may transmit a first resource grant 215 that allocates uplink resources for multiple repetitions 220 of a first TB 225 and a second TB 230. Based on the first resource grant 215, the UE 115-a may begin transmitting the multiple repetitions 220 to the base station 105-a. In some cases, the base station 105-a may receive one or more of the multiple repetitions 220, and determine that one or both of the first TB 225 or the second TB 230 are successfully decoded. In such a case, the base station 105-a may transmit an ACK of the received TB(s) to the UE 115-a, which may then drop one or more remaining repetitions of the TBs.

In some cases, the ACK from the base station 105-a may be an implicit ACK that is provided in a second resource grant 235. For example, the first resource grant 215 may provide a first HARQ process ID for the first TB 225 with a first new data indicator (NDI) and may provide a second HARQ process ID for the second TB 230 with a second NDI. In the case that both TBs are successfully decoded, the base station 105-a may provide the second resource grant 235 that indicates different HARQ process IDs than the first HARQ process ID and the second HARQ process ID, which the UE 115-a may recognize as providing an implicit ACK of the first TB 225 and the second TB 230. In other cases, the base station 105-a may provide the second resource grant 235 that indicates the first HARQ process ID with a toggled first NDI (e.g., to indicate that new data is to be transmitted in association with the HARQ process ID), and that indicates the second HARQ process ID with a toggled second NDI. The UE 115-a may recognize the toggled NDIs of the same HARQ process IDs as providing an implicit ACK of the first TB 225 and the second TB 230. In various techniques as discussed herein, the UE 115-a can determine to drop one or more of the multiple repetitions 220 after an implicit acknowledgment of a TB based on whether the first resource grant 215 and the second resource grant 235 are for a single TB or are for multiple TBs.

In some cases, implicit acknowledgment and associated repetition cancellation are not allowed when the UE 115-a is configured for multi-TB communications. In such cases, the UE 115-a may continue to transmit the multiple repetitions 220 in accordance with the first resource grant 215 irrespective of the second resource grant 235 being received. Thus, the feature of repetition cancellation based on implicit ACK is disabled if the UE is configured with multiple TBs, and only explicit cancellation (e.g., by a DCI that provide explicit HARQ ACK/NACK feedback) may be enabled. In such examples, if the new DCI with the second resource grant 235 schedules a physical uplink shared channel (PUSCH) transmission that overlaps with the previous PUSCH transmission of the first resource grant 215, the UE 115-a (based on being RRC configured with multiple TBs) will not perform cancellation, and will not deliver HARQ-ACK to higher layers. The UE 115-a thus may not expect to receive such a DCI, so the UE 115-a may ignore such a DCI if received.

In other cases, implicit acknowledgment and associated repetition cancellation are allowed when the UE 115-a is configured for multi-TB communications (e.g., when a BL/CE UE is configured with radio resource control (RRC) parameter 'multi-TB-UL-config'). In such cases, the UE 115-a may cancel one or more repetitions based on whether the DCIs that provide the first resource grant 215 and the second resource grant 235 schedule a single TB or multiple TBs. In the event that both DCIs schedule a single TB, the UE 115-a may drop one or more remaining repetitions of the multiple repetitions 220. If one or both of the DCIs schedule multiple TBs, the UE 115-a may not perform cancellation, and not deliver HARQ-ACK to higher layers. In cases where both DCIs to schedule a single TB and the second resource grant 235 is for a new TB (e.g., the second resource grant 235 indicates a different HARQ process ID or different NDI of a same HARQ process ID), the UE 115-a may drop the remaining PUSCH transmission(s) of the TB scheduled by the first resource grant 215 based on one or more criteria. Such criteria may include that the first resource grant 215 schedules uplink transmissions (e.g., PUSCH) in subframes $\{s_0, \ldots, s_{N-1}\}$, and that the second resource grant 235 is received in subframe M and schedules uplink transmissions in subframes $\{q_0, \ldots, q_{L-1}\}$ with $M \leq q_0 \leq s_{N-1}$. In such cases, the UE 115-a may drop the remaining repetition(s) of the TB that were scheduled by the first resource grant 215 starting from subframe K, where $M < K \leq q_0$. The UE 115-a may deliver HARQ-ACK feedback corresponding to the TB scheduled by the first resource grant 215 to higher layers, and may transmit the second communication (e.g., second PUSCH) scheduled by the second resource grant 235 in subframes $\{q_0, \ldots, q_{L-1}\}$.

In other cases, the UE 115-a may determine one or more TBs that are acknowledged, and may cancel repetitions of the acknowledged TBs. Various examples of such cancellations are discussed with reference to FIGS. 3 through 6.

Figure 3:
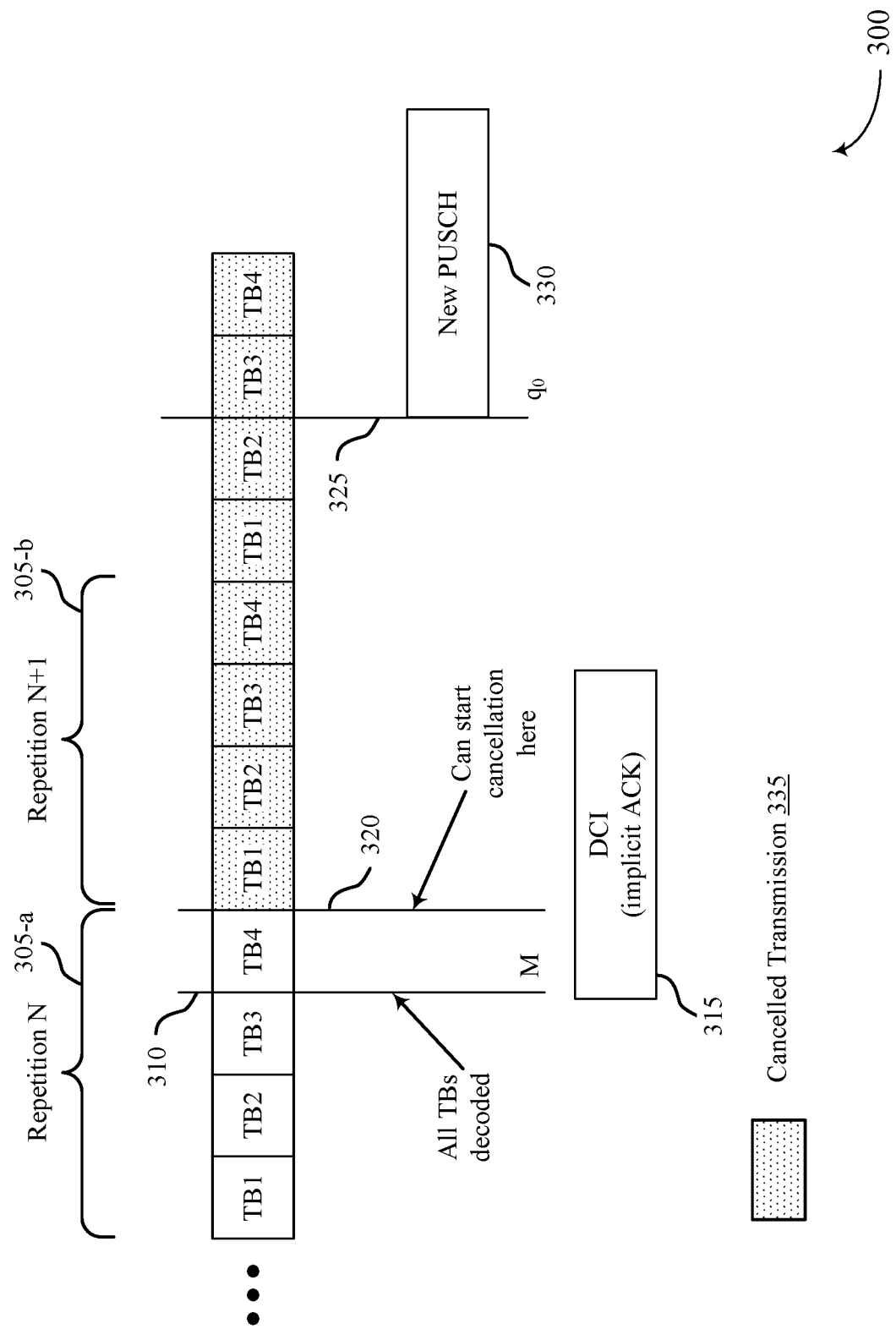
FIGS. 3 through 6 illustrate examples of multiple TB repetitions and implicit acknowledgment that support early termination of uplink communication repetitions with multiple TBs in accordance with aspects of the present disclosure.

FIG. 3 illustrates an example of a multiple TB repetitions and implicit acknowledgment 300 that supports early termination of uplink communication repetitions with multiple TBs in accordance with aspects of the present disclosure. In some examples, multiple TB repetitions and implicit acknowledgment 300 may implement aspects of wireless communications system 100 or 200. In this example, a UE (e.g., a UE 115 of FIG. 1 or 2) may receive a first resource grant for multiple TBs, including TB1 through TB4, that are to be transmitted to a base station (e.g., a base station 105 of FIG. 1 or 2) in uplink transmissions (e.g., PUSCH) in subframes $\{s_0, \ldots, s_{N-1}\}$. In some cases, such as illustrated in FIG. 3, the UE may cancel one or more repetitions of the multiple TBs based on an implicit ACK from the base station.

In this example, the UE may transmit multiple repetitions 305 of the multiple TBs to the base station. To cancel a PUSCH with the multiple TBs that was correctly received, the base station may schedule new TBs (indicated by a different HARQ process ID or different NDI of a same HARQ process ID) in a subsequent DCI 315 transmitted starting in subframe M 310 that schedules new PUSCH 330 in subframes $\{q_0, \ldots, q_{L-1}\}$ starting at 325. Further, to cancel a PUSCH, the base station has to have received it already (i.e., the base station cannot cancel a transmission before it is decoded), and thus the earliest that subframe M 310 may occur is $s_0+k$, where k corresponds to a processing timeline associated with HARQ ACK/NACK (e.g., four or more subframes or transmission time intervals (TTIs)). The prior DCI may schedule F HARQ processes $H=\{h_1, \ldots, h_F\}$ with corresponding NDI $n(h_i)$. For each of the HARQ processes, the corresponding TB starts in subframe $s(h_i)$. The second DCI 315 (starting in subframe $m_0$) schedules F' HARQ processes $H'=\{h'_1, \ldots, h'_{F'}\}$ with corresponding NDI $n'(h_i)$. For each of the HARQ processes, the corresponding TB starts in subframe $s'(h_i)$.

In this example, cancellation may be performed in the event that there is ACK for all F HARQ processes. In this case, an exemplary rule may provide that: for each HARQ process $h_i \in \{h_1, \ldots, h_F\}$, either:
1. $h_i \notin \{h'_1, \ldots h'_F\}$ (i.e., the HARQ process is not scheduled again), OR
2. $h_i \in \{h'_1, \ldots, h'_F\}$ AND $n'(h_i) \neq n(h_i)$ (i.e., the NDI is different)
   NOTE: The condition can be written as $\forall h_i \in H, h_i \notin H'$ or $s(h_i) \neq s'(h_i)$
3. Additionally, the timing constraint for all TBs: $m_0 \geq \max\{s_i\}+k$.

If these conditions are met, the UE will cancel the current PUSCH starting at 320 (or repetition N+1 305-b), resulting in cancelled transmissions 335, deliver HARQ-ACK to upper layers and start the new PUSCH 330 starting at go 325.

Figure 4:
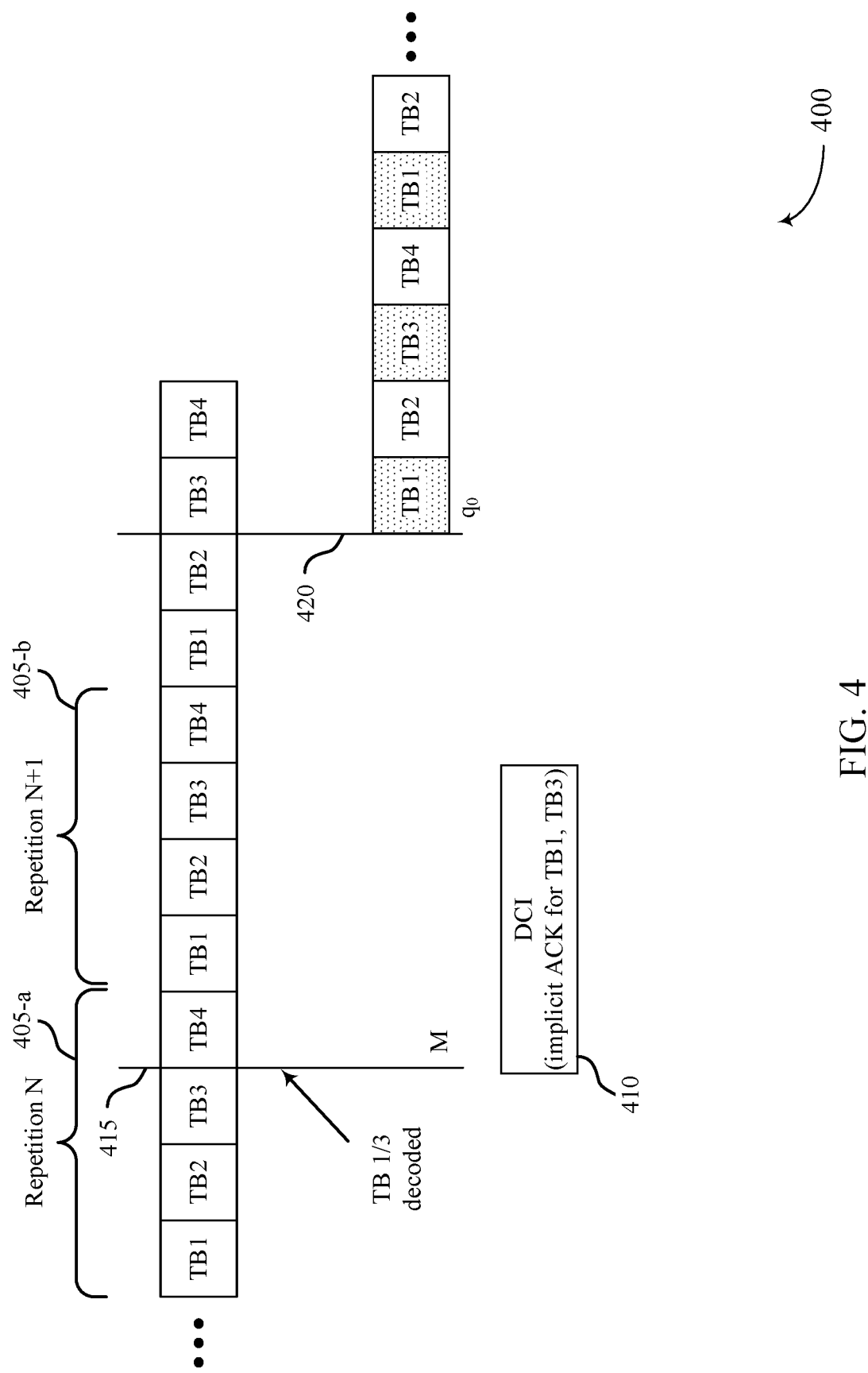

FIG. 4 illustrates an example of a multiple TB repetitions and implicit acknowledgment 400 that supports early termination of uplink communication repetitions with multiple TBs in accordance with aspects of the present disclosure. In some examples, multiple TB repetitions and implicit acknowledgment 400 may implement aspects of wireless communications system 100 or 200. In this example, a UE (e.g., a UE 115 of FIG. 1 or 2) may receive a first resource grant for multiple TBs, including TB1 through TB4, that are to be transmitted to a base station (e.g., a base station 105 of FIG. 1 or 2) in uplink transmissions (e.g., PUSCH) in subframes $\{s_0, \ldots, s_{N-1}\}$. In some cases, such as illustrated in FIG. 4, the UE may cancel one or more repetitions of the multiple TBs based on an implicit ACK from the base station that partially acknowledges only a subset of the multiple TBs.

In this example, the UE may transmit multiple repetitions 405 of the multiple TBs to the base station. To partially cancel a PUSCH with the multiple TBs where one or more of the TBs are correctly received, the base station may schedule new TBs (indicated by a different HARQ process ID or different NDI of a same HARQ process ID) in a subsequent second DCI 410 transmitted starting in subframe M 415 that schedules new PUSCH in subframes $\{q_0, \ldots, q_{L-1}\}$ starting at 420. In this example, a TB corresponding to a HARQ process ID is not considered as acknowledged if the second DCI 410 schedules that HARQ process with the same NDI. Further, a TB corresponding to a HARQ process ID is considered acknowledged if the second DCI 410 does not schedule that HARQ process ID, or if the NDI for that HARQ process ID is toggled (indicating a new TB). In the example of FIGS. 4, TB1 and TB3 may be successfully decoded at the base station. In this example, the second DCI 410 may provide implicit ACK for TB1 and TB3, and the UE may deliver a HARQ indication to upper layers for the corresponding HARQ processes. In the example of FIG. 4, the second DCI 410 may schedule the HARQ process IDs for TB1/TB3 with toggled NDI (indicating new TB relative to a prior first DCI), and schedules the HARQ process of TB2/TB4 with the same NDI (indicating no new TB). Thus, the UE may continue transmitting repetitions of TB2/TB4.

In some cases, one or more timing rules may be provided for implicit ACKs and early termination of repetitions 405. In some cases, for all TBs that are acknowledged, there is a "timing constraint" based on an N+K constraint, where K is described below with reference to FIGS. 5 and 6, and N is a HARQ feedback processing timeline. In some cases, the constraint may not be needed, since the base station may send a ACK for a TB that has been decoded in the previous attempt (but was not ACK'd in a previous DCI due to timeline). For example, a first DCI prior to second DCI 410 may schedule TB1, TB2, TB3, and TB4, with corresponding HARQ process IDs and NDIs. The base station may decode TBs 1 and 2 correctly, and decide to send ACK for these TBs (e.g. schedule a new TB in those HARQ processes). While the base station prepares the DCI, it may decode TBs 3 and 4 correctly. Then, the UE will keep transmitting TBs 3 and 4 while the base station has decoded them already, and the base station may ACK them before processing the second DCI 410. An alternative timing would be that the UE has started transmission of the first PUSCH, and the PUSCH resources allocated in the second DCI 410 overlap with the PUSCH in the first DCI.

Figure 5:
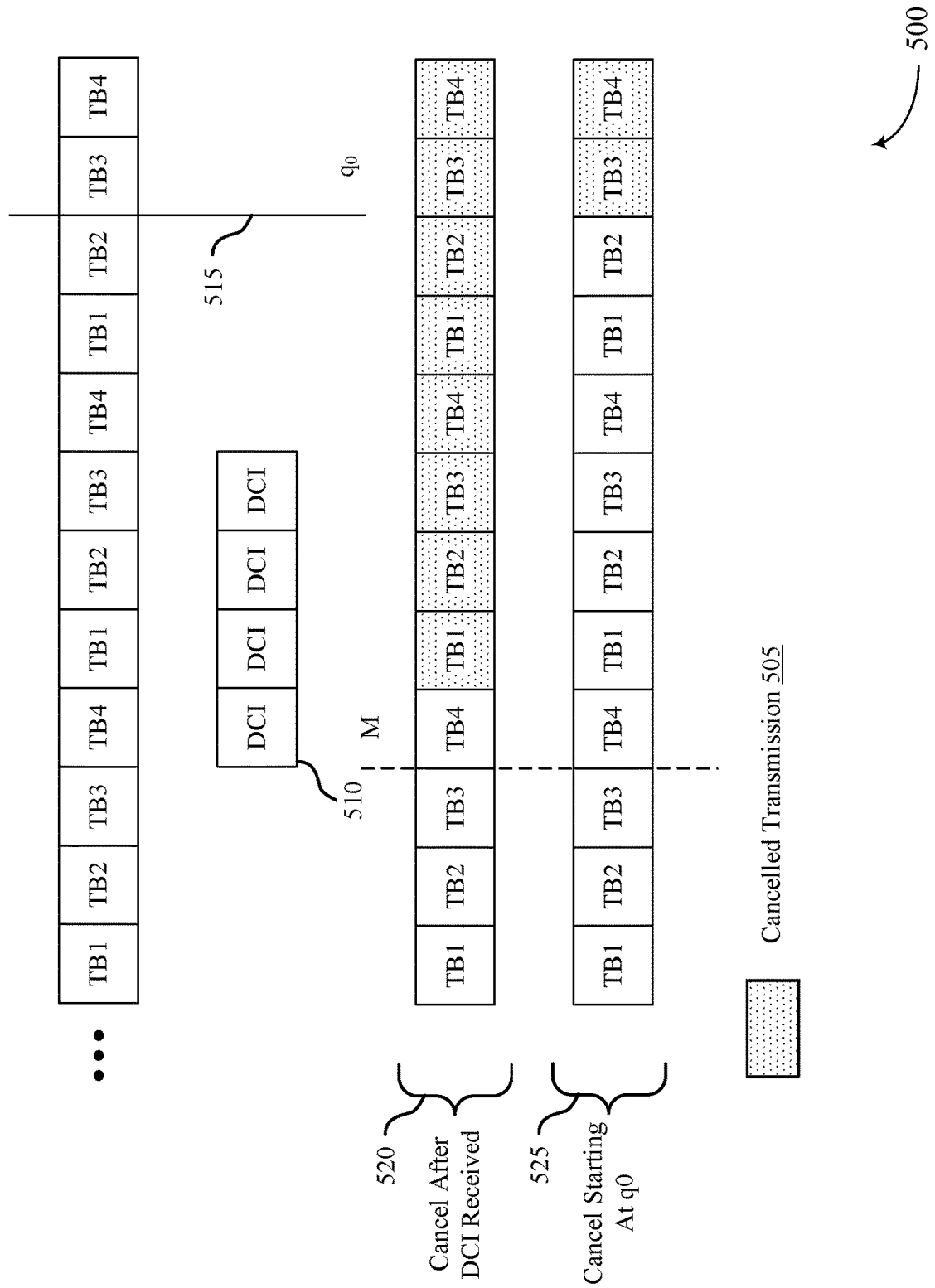

FIG. 5 illustrates an example of a multiple TB repetitions and implicit acknowledgment 500 that supports early termination of uplink communication repetitions with multiple TBs in accordance with aspects of the present disclosure. In some examples, multiple TB repetitions and implicit acknowledgment 500 may implement aspects of wireless communications system 100 or 200. In this example, a UE (e.g., a UE 115 of FIG. 1 or 2) may receive a first resource grant for multiple TBs (e.g., in a first DCI), including TB1 through TB4, that are to be transmitted to a base station (e.g., a base station 105 of FIG. 1 or 2) in uplink transmissions (e.g., PUSCH) in subframes $\{s_0, \ldots, s_{N-1}\}$. In some cases, such as illustrated in FIG. 5, the UE may cancel one or more repetitions of the multiple TBs based on an implicit ACK from the base station that partially acknowledges only a subset of the multiple TBs, as indicated at cancelled transmissions 505.

In this example, the UE may transmit multiple repetitions of the multiple TBs (e.g., TB1/TB2/TB3/TB4) to the base station. To cancel a PUSCH with the multiple TBs where one or more of the TBs are correctly received, the base station may schedule new TBs (indicated by a different HARQ process ID or different NDI of a same HARQ process ID) in a subsequent second DCI 510 transmitted starting in subframe M that schedules new PUSCH in subframes $\{q_0, \ldots, q_{L-1}\}$ starting at 515. In this example, again, a TB corresponding to a HARQ process ID is not considered as acknowledged if the second DCI 510 schedules that HARQ process with the same NDI. Further, a TB corresponding to a HARQ process ID is considered acknowledged if the second DCI 510 does not schedule that HARQ process ID, or if the NDI for that HARQ process ID is toggled (indicating a new TB).

In a first example 520, the timing for cancellation may be "as soon as possible," and thus cancellation may start any time after the second DCI 510 is received and before the next PUSCH starts. In such cases, the UE may drop the remaining PUSCH transmission(s) of the transport blocks scheduled by the first DCI starting from subframe K, where $M < K \leq q_0$. In cases where the base station ACKs only a subset of the TBs, the base station may keep receiving the PUSCH from the first DCI while the UE processes the second DCI 510. In some cases, in order to maintain phase continuity of the PUSCH, it may be useful to transmit the acknowledged TBs, however such transmissions may consume additional power at the UE. In such cases, it is not useful to early terminate the TBs that are not acknowledged, but at the same time it is not useful to transmit the TBs that are acknowledged. Thus in the first example 520, in the case where the base station acknowledges TB2 and TB4 by indicting a new HARQ process ID or toggled NDI in the second DCI 510, the UE may start cancellation of all TBs upon determining that TB2 and TB4 are acknowledged. The second DCI 510, in such a case may contain the HARQ process ID with an untoggled NDI for TB1 and TB3, and thus repetitions of these TBs are resumed starting at $q_0$ in accordance with the second DCI 510 resource allocation.

In other examples, such as illustrated in second example 525 of FIG. 5, the UE may start cancellation right before starting the second PUSCH transmission (i.e., the cancellation is in $q_0$). In the case where TB2 and TB4 are acknowledged, such a technique may allow for some additional repetitions of unacknowledged TB1 and TB3 to be transmitted, which may allow for earlier decoding at the base station. In some cases, the timing for the cancellation may be selected between the first example or the second example based on one or more factors, such as an amount of time between M and $q_0$ (e.g., use the timing of first example 520 if the time is less than a threshold value, otherwise use the timing of second example 525), whether all TBs are acknowledged or not (e.g., use the timing of first example 520 if all TBs are acknowledged, otherwise use the timing of second example 525). Other examples of timing for cancellation of one or more TB repetitions are illustrated in FIG. 6.

Figure 6:
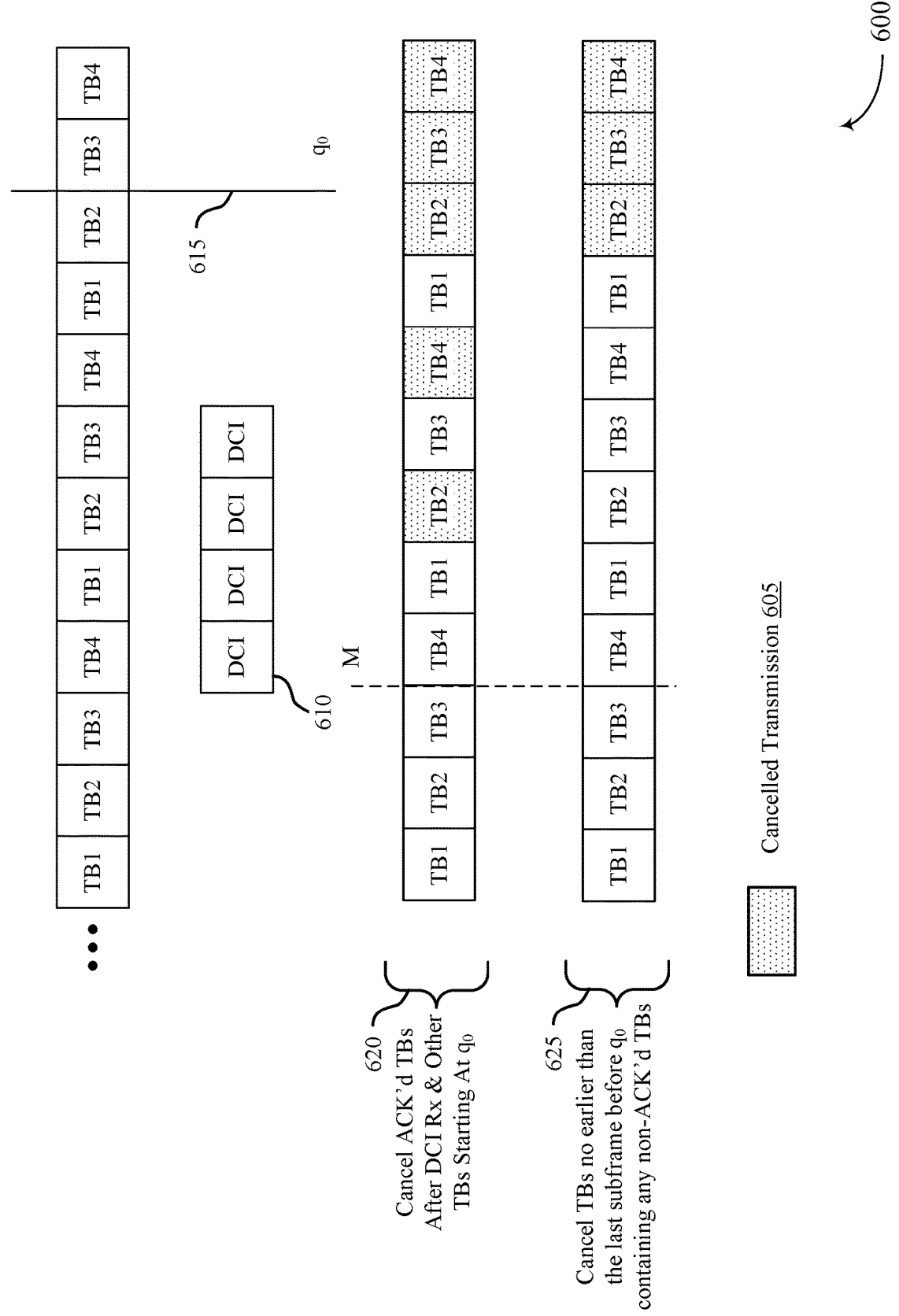

FIG. 6 illustrates an example of a multiple TB repetitions and implicit acknowledgment 600 that supports early termination of uplink communication repetitions with multiple TBs in accordance with aspects of the present disclosure. In some examples, multiple TB repetitions and implicit acknowledgment 600 may implement aspects of wireless communications system 100 or 200. In this example, similarly as in FIG. 5, a UE (e.g., a UE 115 of FIG. 1 or 2) may receive a first resource grant for multiple TBs (e.g., in a first DCI), including TB1 through TB4, that are to be transmitted to a base station (e.g., a base station 105 of FIG. 1 or 2) in uplink transmissions (e.g., PUSCH) in subframes $\{s_0, \ldots, s_{N-1}\}$. In some cases, such as illustrated in FIG. 5, the UE may cancel one or more repetitions of the multiple TBs based on an implicit ACK from the base station that partially acknowledges only a subset of the multiple TBs, as indicated at cancelled transmissions 605.

In this example, again, the UE may transmit multiple repetitions of the multiple TBs (e.g., TB1/TB2/TB3/TB4) to the base station, and to cancel a PUSCH with the multiple TBs where one or more of the TBs are correctly received, the base station may schedule new TBs (indicated by a different HARQ process ID or different NDI of a same HARQ process ID) in a subsequent second DCI 610 transmitted starting in subframe M that schedules new PUSCH in subframes $\{q_0, \ldots, q_{L-1}\}$ starting at 615. As discussed herein, a TB corresponding to a HARQ process ID is not considered as acknowledged if the second DCI 610 schedules that HARQ process with the same NDI. Further, a TB corresponding to a HARQ process ID is considered acknowledged if the second DCI 610 does not schedule that HARQ process ID, or if the NDI for that HARQ process ID is toggled (indicating a new TB).

In a third example 620, for acknowledged TBs, the UE may cancel as soon as possible, and for non-acknowledged TBs that UE may cancel starting at $q_0$ 615. Thus, in this example, an acknowledgment of TB2 and TB4 results in cancellations of TB2 and TB4 starting at M. Further, TB1 and TB3 may continue to be transmitted. In such cases, holes in the transmission may be created which may degrade receive performance at the base station, but the repetitions of these TBs will still be transmitted.

In a fourth example, 625, the UE may drop the remaining PUSCH no earlier than K, where K is the last subframe before $q_0$ containing any of the TB(s) that were not acknowledged. Thus, the UE may transmit some repetitions of acknowledged TBs, but may cancel the transmissions when any remaining TBs before $q_0$ have been acknowledged.

In some cases, the second DCI 610 may have to indicate at least one TB that is acknowledged (i.e., the base station is not to trigger the same set of NDI/HARQ processes in second DCI 610 as in the first DCI). It is noted that the various examples illustrated in FIGS. 2 through 6 show interleaved TBs (i.e., repetitions of multiple sequential TBs in order). In some cases, repetitions may have non-interleaved TBs (i.e., a same TB is repeated N number of times, followed by N repetitions of a next sequential TB). In cases that use non-interleaved repetitions, the timing for cancellation of repetitions may be selected based on such a factor. For example, partial cancellation (e.g., in the third example 620) may be allowed for interleaved TBs, and only full cancellation (e.g., in the example of FIG. 3) may be allows for non-interleaved TBs. The timing for cancellations may also be adjusted based on whether the TBs are interleaved or non-interleaved (e.g., cancellation as soon as possible for non-interleaved versus timing of the examples of FIGS. 5 and 6 for interleaved).

Figure 7:
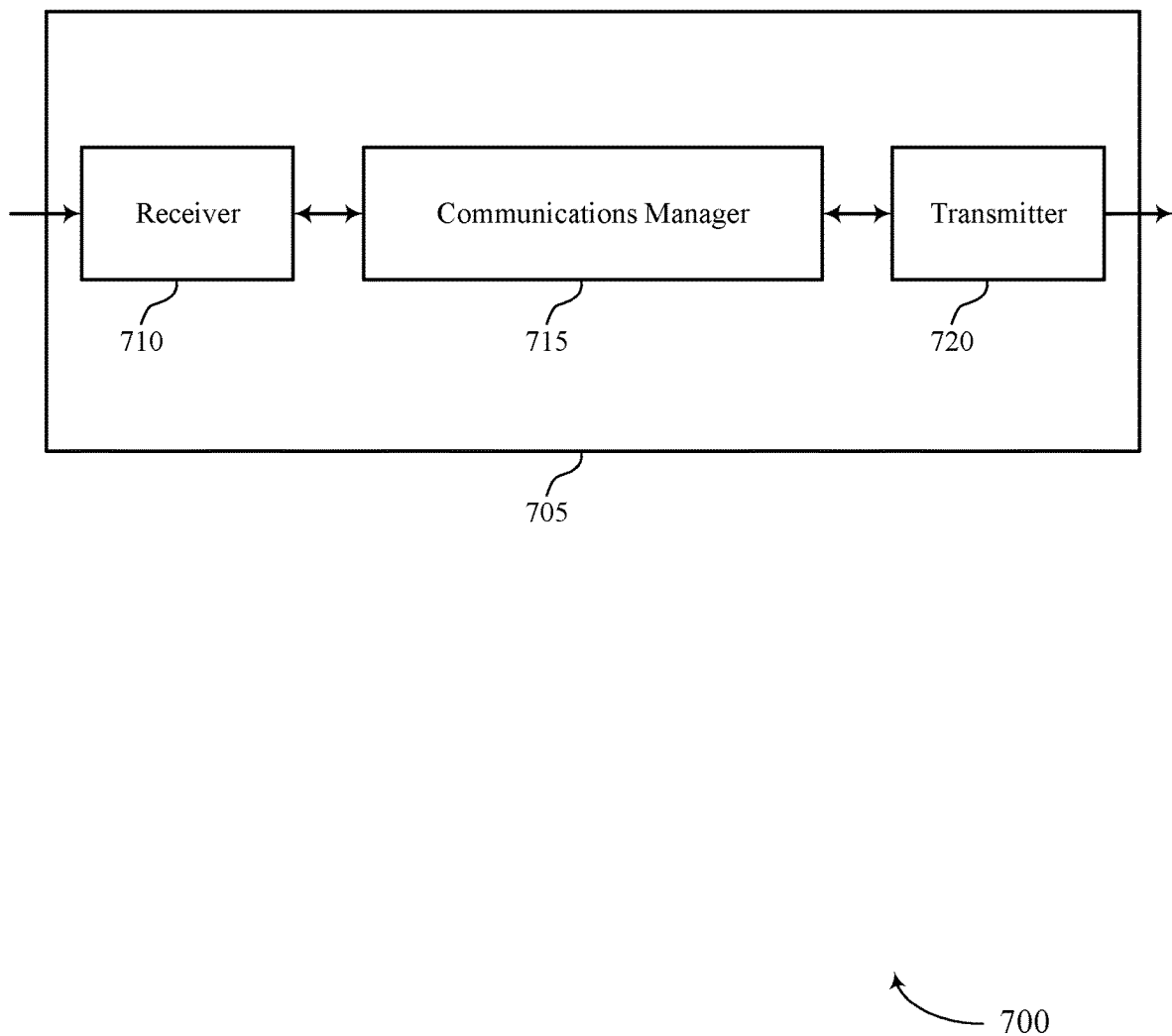
FIGS. 7 and 8 show block diagrams of devices that support early termination of uplink communication repetitions with multiple TBs in accordance with aspects of the present disclosure.

FIG. 7 shows a block diagram 700 of a device 705 that supports early termination of uplink communication repetitions with multiple TBs in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to early termination of uplink communication repetitions with multiple TBs, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may transmit, to a base station, one or more repetitions of a first uplink communication based on a first resource grant received from the base station, receive, from the base station, a second resource grant for a second uplink communication that at least partially overlaps with resources for one or more repetitions of the first uplink communication, and determine to cancel or to transmit one or more remaining repetitions of the first uplink communication based on the second resource grant providing an implicit acknowledgment of successful receipt of at least one TB of the first uplink communication and based on whether one or more of the first resource grant or the second resource grant schedules multiple TBs. The communications manager 715 may be an example of aspects of the communications manager 1010 described herein.

The communications manager 715 may as described herein be implemented to realize one or more potential advantages. One implementation may allow the device 705 to determine whether a to cancel one or more repetitions of a communication based on an implicit acknowledgment of one or more TBs of the communication, which may allow for efficient use of resources and reduced power consumption at a UE. Further, implementations may allow the device 705 to increase communications reliability, throughput, and enhance user experience, while reducing overall power consumption, among other advantages.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
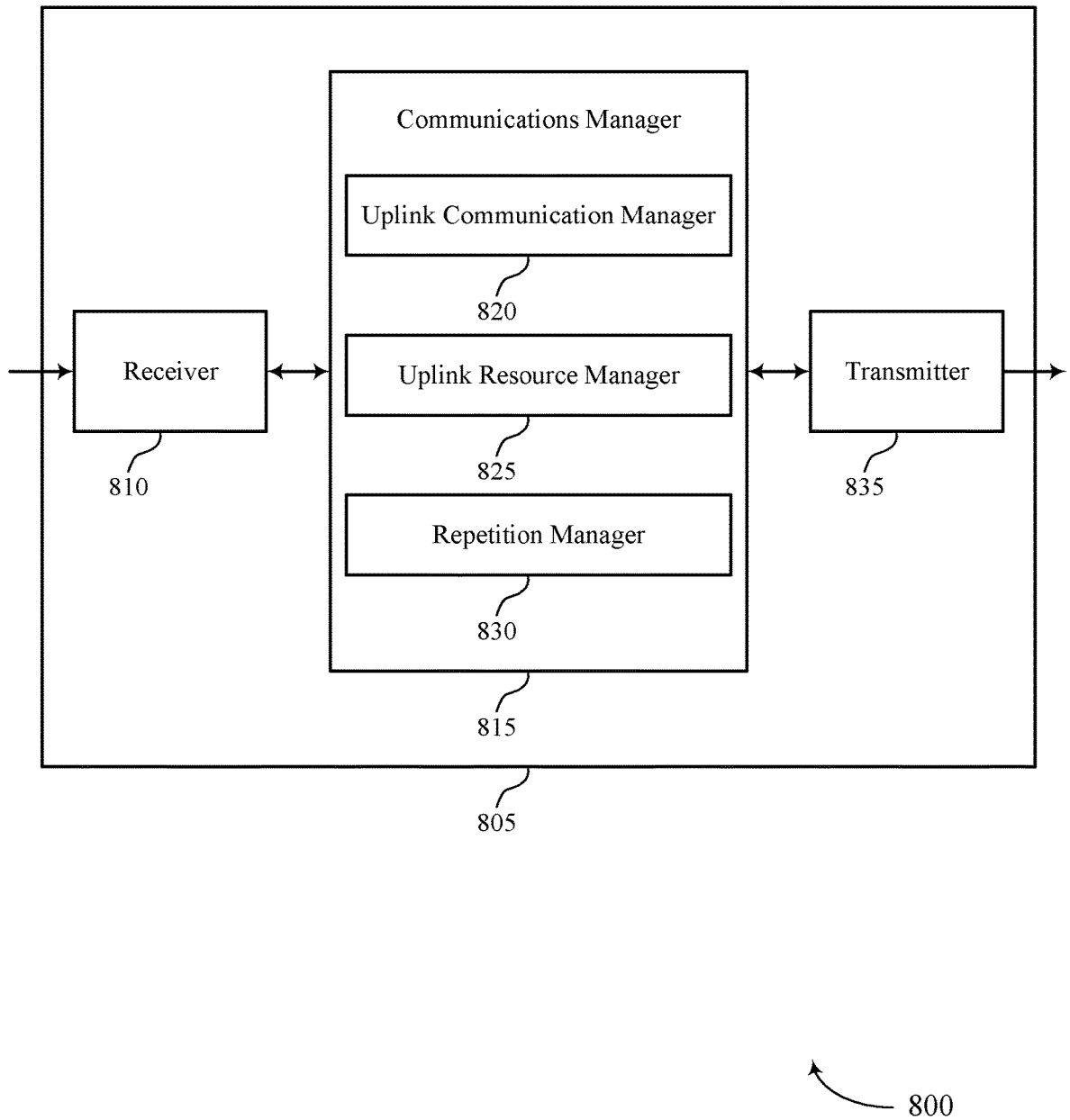

FIG. 8 shows a block diagram 800 of a device 805 that supports early termination of uplink communication repetitions with multiple TBs in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to early termination of uplink communication repetitions with multiple TBs, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an uplink communication manager 820, an uplink resource manager 825, and a repetition manager 830. The communications manager 815 may be an example of aspects of the communications manager 1010 described herein.

The uplink communication manager 820 may transmit, to a base station, one or more repetitions of a first uplink communication based on a first resource grant received from the base station.

The uplink resource manager 825 may receive, from the base station, a second resource grant for a second uplink communication that at least partially overlaps with resources for one or more repetitions of the first uplink communication.

The repetition manager 830 may determine to cancel or to transmit one or more remaining repetitions of the first uplink communication based on the second resource grant providing an implicit acknowledgment of successful receipt of at least one TB of the first uplink communication and based on whether one or more of the first resource grant or the second resource grant schedules multiple TBs.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
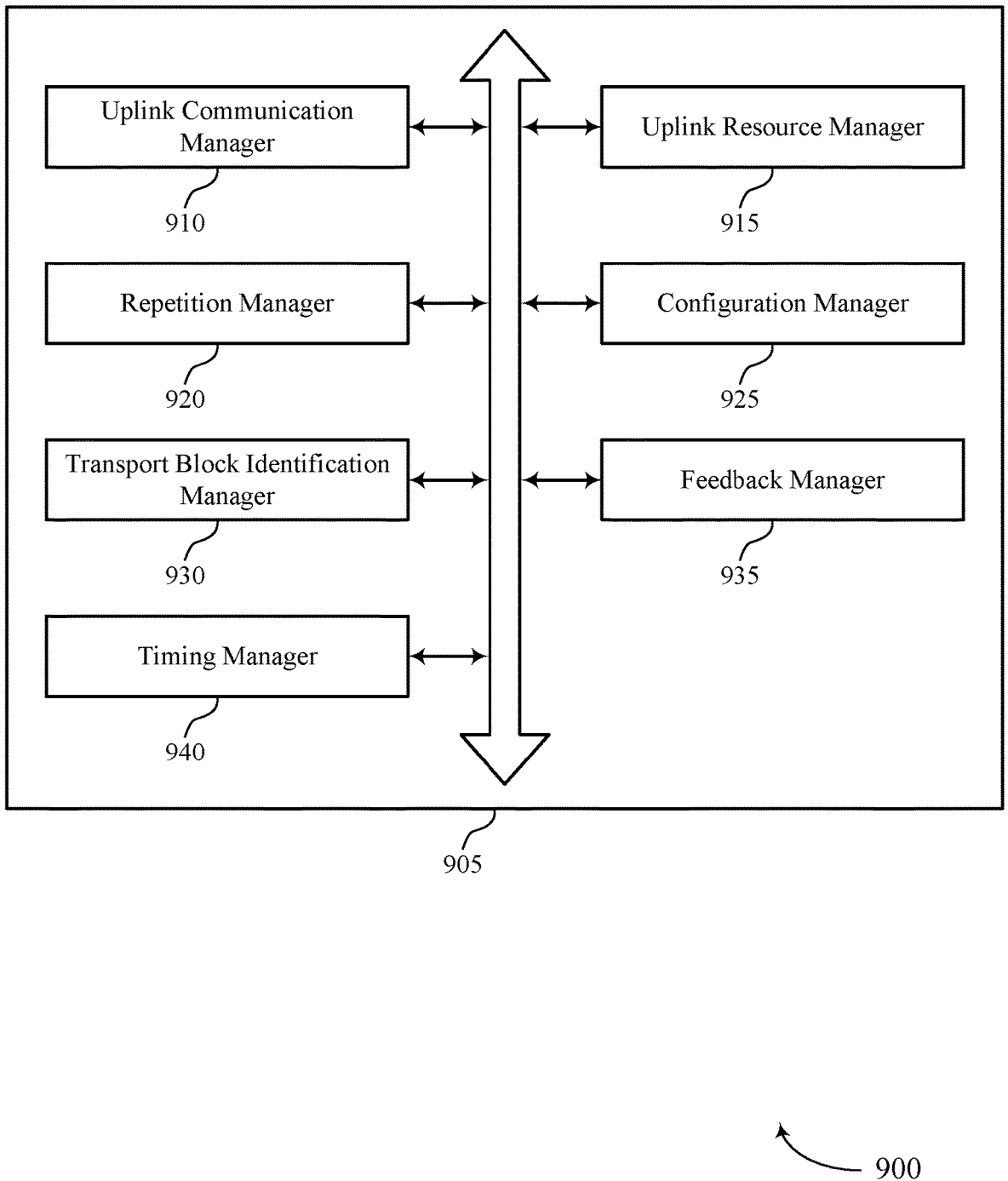
FIG. 9 shows a block diagram of a communications manager that supports early termination of uplink communication repetitions with multiple TBs in accordance with aspects of the present disclosure.

FIG. 9 shows a block diagram 900 of a communications manager 905 that supports early termination of uplink communication repetitions with multiple TBs in accordance with aspects of the present disclosure. The communications manager 905 may be an example of aspects of a communications manager 715, a communications manager 815, or a communications manager 1010 described herein. The communications manager 905 may include an uplink communication manager 910, an uplink resource manager 915, a repetition manager 920, a configuration manager 925, a TB identification manager 930, a feedback manager 935, and a timing manager 940. Each of these modules may communicate, directly or indirectly, with one another (e.g., via one or more buses).

The uplink communication manager 910 may transmit, to a base station, one or more repetitions of a first uplink communication based on a first resource grant received from the base station. The uplink resource manager 915 may receive, from the base station, a second resource grant for a second uplink communication that at least partially overlaps with resources for one or more repetitions of the first uplink communication.

The repetition manager 920 may determine to cancel or to transmit one or more remaining repetitions of the first uplink communication based on the second resource grant providing an implicit acknowledgment of successful receipt of at least one TB of the first uplink communication and based on whether one or more of the first resource grant or the second resource grant schedules multiple TBs. In some examples, the repetition manager 920 may determine to cancel the one or more remaining repetitions of the first uplink communication based on identifying that one or more of the first resource grant or the second resource grant schedules multiple transport blocks.

In some examples, the repetition manager 920 may transmit one or more repetitions of the second uplink communication based on the second resource grant. In some examples, the repetition manager 920 may transmit one or more repetitions of the second uplink communication based on the second resource grant in resources associated with the first TB. In some examples, the repetition manager 920 may transmit one or more repetitions of at least a second TB of the first set of TBs that is unacknowledged by the base station. In some examples, the repetition manager 920 may determine that the second uplink communication is to be transmitted using resources that overlap resources of the first uplink communication. In some cases, the determining to cancel or to transmit the one or more remaining repetitions of the first uplink communication is further determined based on whether multiple TBs scheduled by the first resource grant are interleaved or are non-interleaved.

The configuration manager 925 may receive, from the base station, configuration information that enables resource grants for multiple TBs, where cancellation of repetitions of TBs is disabled based on the configuration information that enables resource grants for multiple TBs, and where cancellation of repetitions based on implicit acknowledgment of TBs is enabled based on configuration information that disables resource grants for multiple TBs.

In some examples, the configuration manager 925 may determine to transmit the one or more remaining repetitions of the first uplink communication based on the configuration information. In some examples, the configuration manager 925 may disregard the second resource grant based on the determining to transmit the one or more remaining repetitions of the first uplink communication.

The TB identification manager 930 may identify that one or more of the first resource grant or the second resource grant schedules multiple TBs. In some examples, the TB identification manager 930 may determine to transmit the one or more remaining repetitions of the first uplink communication based on the identifying. In some examples, the TB identification manager 930 may identify that each of the first resource grant and the second resource grant schedule a single TB and that the second resource grant provides an acknowledgment of the TB associated with the first resource grant. In some examples, the TB identification manager 930 may identify that each of two or more TBs scheduled by the first resource grant are acknowledged by the base station based on the second resource grant.

The feedback manager 935 may identify that at least a first TB of a first set of TBs scheduled by the first resource grant is acknowledged as being successfully received at the base station based on the second resource grant. In some examples, the feedback manager 935 may deliver an acknowledgment indication for the first TB from a physical layer of a protocol stack at the UE to a higher layer of the protocol stack.

In some cases, the two or more TBs scheduled by the first resource grant are each determined to be acknowledged by the base station based on the second resource grant indicating a second set of feedback process identifications (FPIs), where each FPI of the second set of FPIs either is not included in a first set of FPIs in the first resource grant, or is included in the first set of FPIs and has a different new data indicator.

In some cases, the first TB is associated with a first feedback process identification and a first new data indicator value and the first TB is determined to be acknowledged based on the second resource grant including the first feedback process identification with a different new data indicator than the first new data indicator value, or the first TB is determined to be acknowledged based on the first feedback process identification not being included in the second resource grant.

The timing manager 940 may determine that the one or more repetitions of the second resource grant are scheduled to be transmitted after at least a threshold time period following a first repetition of the two or more TBs scheduled by the first resource grant. In some examples, the timing manager 940 may determine a timing for transmitting a first repetition of the second TB that is after at least a threshold time period following the second resource grant.

In some cases, the timing for cancelling the one or more remaining repetitions of the first uplink communication corresponds to a time period from a first instance available for transmission of the first transport block after receiving the second resource grant to a first uplink resource allocated by the second resource grant. In some cases, the timing for cancelling the one or more remaining repetitions of the first uplink communication corresponds to a time period from a first instance available for transmission of the first TB after receiving the second resource grant to a first uplink resource allocated by the second resource grant. In some cases, the timing for cancelling the one or more remaining repetitions of the first uplink communication corresponds to a first instance available for transmission of the first transport block after the second resource grant when successful receipt of each transport block of the first uplink communication is acknowledged.

In some cases, the timing for cancelling the one or more remaining repetitions of the first uplink communication corresponds to a first instance available for transmission of the second transport block based on the second resource grant when successful receipt of less than all transport blocks of the first uplink communication is acknowledged. In some cases, the timing for cancelling the one or more remaining repetitions of the first uplink communication corresponds to a first instance available for transmission of the first transport block when successful receipt of the first transport block is acknowledged. In some cases, the timing for cancelling the one or more remaining repetitions of the first uplink communication corresponds to a first instance available for transmission of the second transport block based on the second resource grant when successful receipt of the first transport block is unacknowledged. In some cases, the timing for cancelling the one or more remaining repetitions of the first uplink communication corresponds to a first instance available for transmission of the second transport block after a transmission of a latest transport block of the first uplink communication for which successful receipt is unacknowledged.

Figure 10:
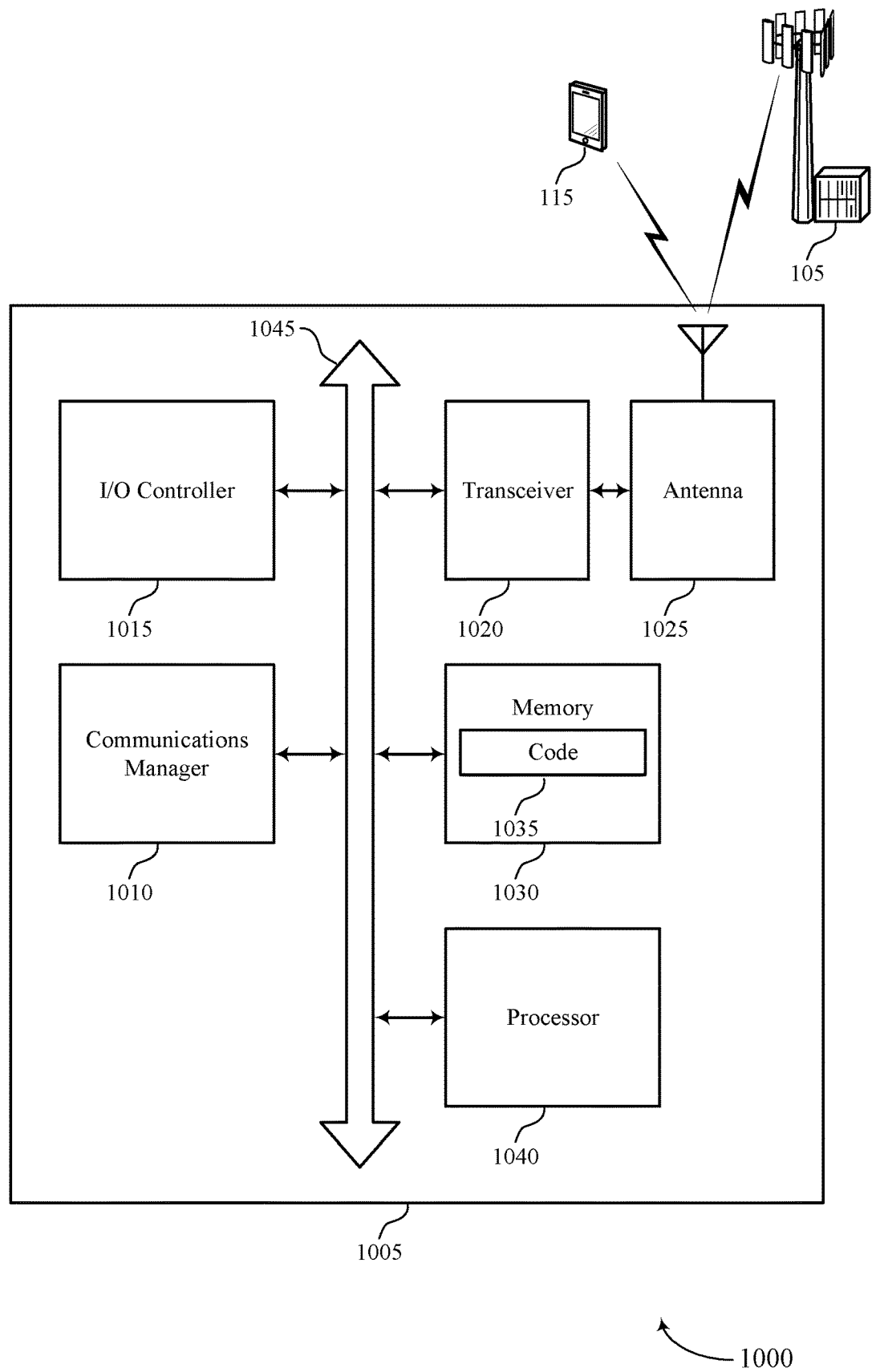
FIG. 10 shows a diagram of a system including a device that supports early termination of uplink communication repetitions with multiple TBs in accordance with aspects of the present disclosure.

FIG. 10 shows a diagram of a system 1000 including a device 1005 that supports early termination of uplink communication repetitions with multiple TBs in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may transmit, to a base station, one or more repetitions of a first uplink communication based on a first resource grant received from the base station, receive, from the base station, a second resource grant for a second uplink communication that at least partially overlaps with resources for one or more repetitions of the first uplink communication, and determine to cancel or to transmit one or more remaining repetitions of the first uplink communication based on the second resource grant providing an implicit acknowledgment of successful receipt of at least one TB of the first uplink communication and based on whether one or more of the first resource grant or the second resource grant schedules multiple TBs.

The communications manager 1010 may as described herein be implemented to realize one or more potential advantages. One implementation may allow the device 1005 to determine whether a to cancel one or more repetitions of a communication based on an implicit acknowledgment of one or more TBs of the communication, which may allow for efficient use of resources and reduced power consumption at a UE. Further, implementations may allow the device 1005 to increase communications reliability, throughput, and enhance user experience, while reducing overall power consumption, among other advantages.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting early termination of uplink communication repetitions with multiple TBs).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
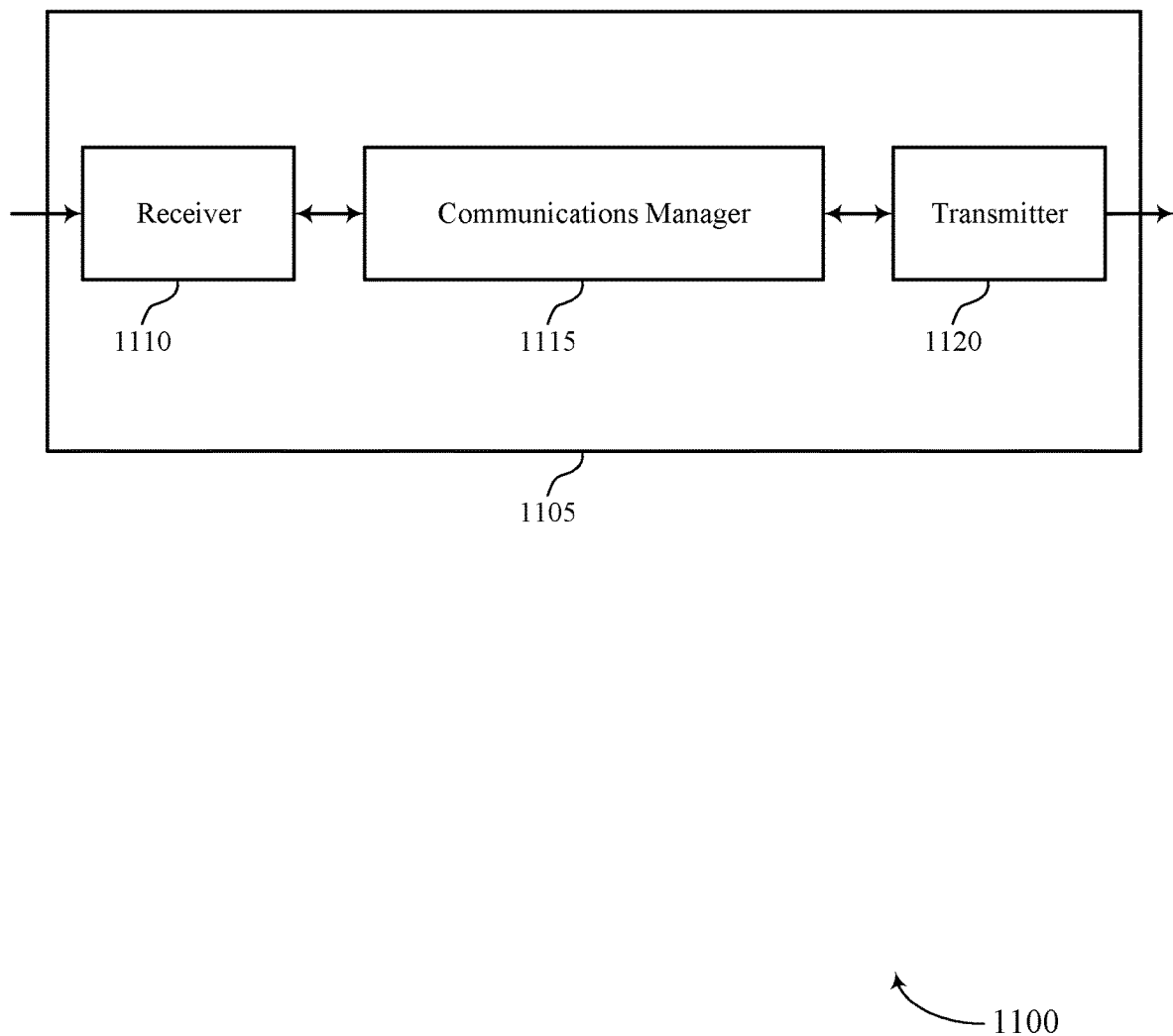
FIGS. 11 and 12 show block diagrams of devices that support early termination of uplink communication repetitions with multiple TBs in accordance with aspects of the present disclosure.

FIG. 11 shows a block diagram 1100 of a device 1105 that supports early termination of uplink communication repetitions with multiple TBs in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to early termination of uplink communication repetitions with multiple TBs, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE a first resource grant for one or more repetitions of a first uplink communication to be transmitted by the UE, transmit, to the UE, a second resource grant for a second uplink communication that at least partially overlaps with resources for one or more repetitions of the first uplink communication and provides an implicit acknowledgment of successful receipt of the first TB, where the second resource grant indicates that the UE is to cancel further repetitions of the first TB based on whether one or more of the first resource grant or the second resource grant schedules multiple TBs, receive, from the UE, one or more repetitions of the first uplink communication, and determine to cancel one or more remaining repetitions of the first uplink communication based on successfully decoding at least a first TB of the first uplink communication. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
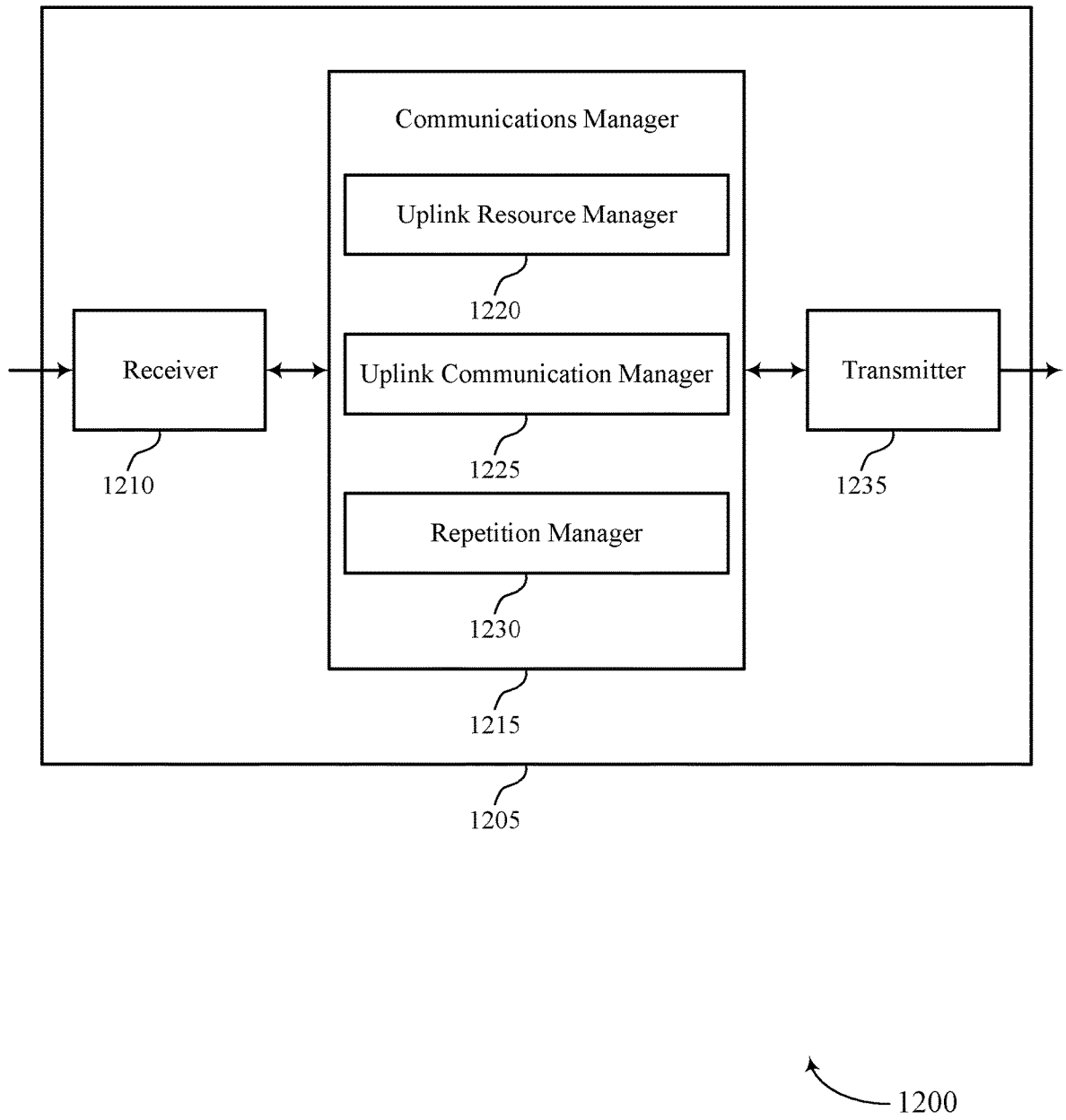

FIG. 12 shows a block diagram 1200 of a device 1205 that supports early termination of uplink communication repetitions with multiple TBs in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to early termination of uplink communication repetitions with multiple TBs, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an uplink resource manager 1220, an uplink communication manager 1225, and a repetition manager 1230. The communications manager 1215 may be an example of aspects of the communications manager 1410 described herein.

The uplink resource manager 1220 may transmit, to a UE a first resource grant for one or more repetitions of a first uplink communication to be transmitted by the UE and transmit, to the UE, a second resource grant for a second uplink communication that at least partially overlaps with resources for one or more repetitions of the first uplink communication and provides an implicit acknowledgment of successful receipt of the first TB, where the second resource grant indicates that the UE is to cancel further repetitions of the first TB based on whether one or more of the first resource grant or the second resource grant schedules multiple TBs.

The uplink communication manager 1225 may receive, from the UE, one or more repetitions of the first uplink communication.

The repetition manager 1230 may determine to cancel one or more remaining repetitions of the first uplink communication based on successfully decoding at least a first TB of the first uplink communication.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
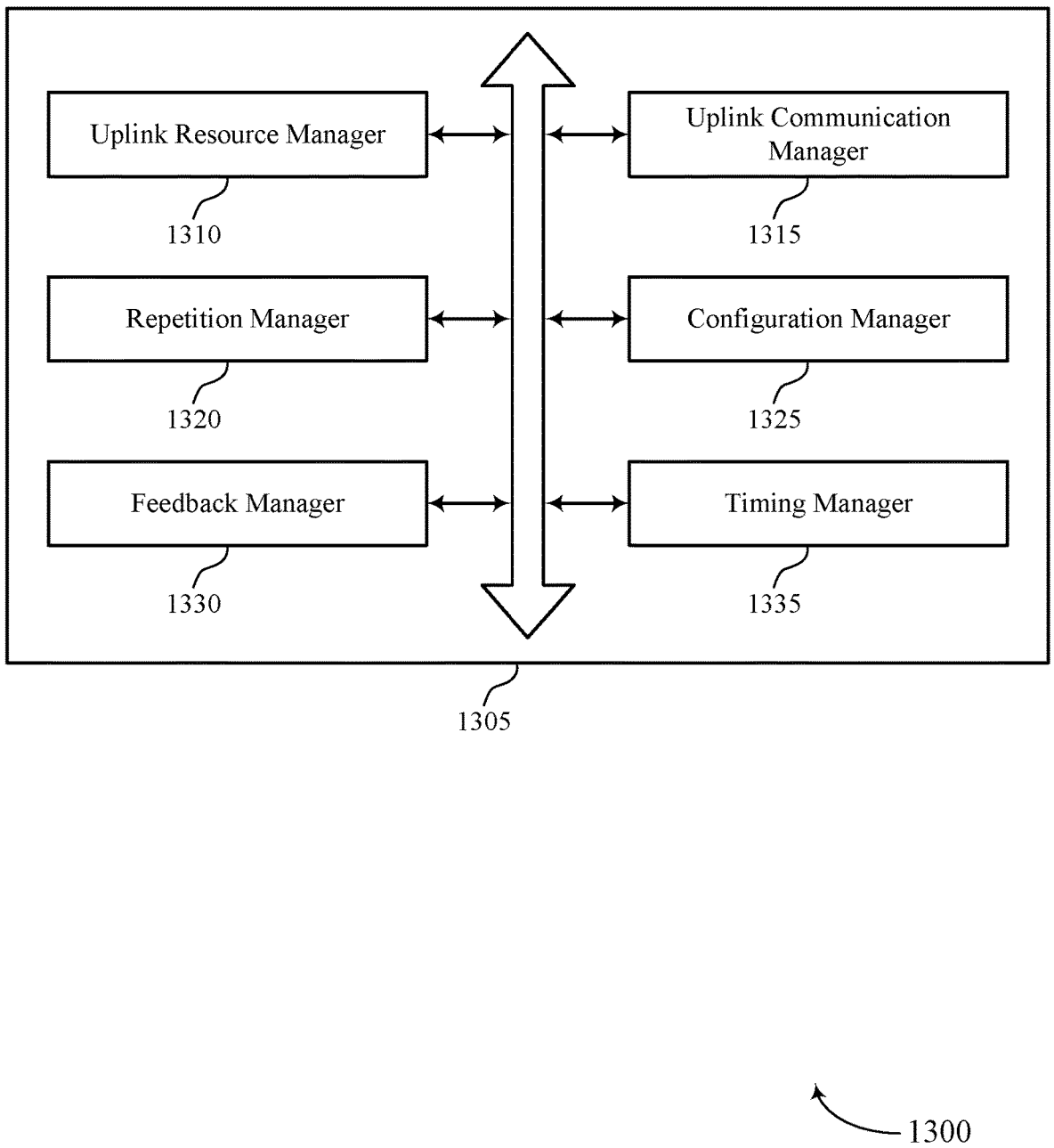
FIG. 13 shows a block diagram of a communications manager that supports early termination of uplink communication repetitions with multiple TBs in accordance with aspects of the present disclosure.

FIG. 13 shows a block diagram 1300 of a communications manager 1305 that supports early termination of uplink communication repetitions with multiple TBs in accordance with aspects of the present disclosure. The communications manager 1305 may be an example of aspects of a communications manager 1115, a communications manager 1215, or a communications manager 1410 described herein. The communications manager 1305 may include an uplink resource manager 1310, an uplink communication manager 1315, a repetition manager 1320, a configuration manager 1325, a feedback manager 1330, and a timing manager 1335. Each of these modules may communicate, directly or indirectly, with one another (e.g., via one or more buses).

The uplink resource manager 1310 may transmit, to a UE a first resource grant for one or more repetitions of a first uplink communication to be transmitted by the UE. In some examples, the uplink resource manager 1310 may transmit, to the UE, a second resource grant for a second uplink communication that at least partially overlaps with resources for one or more repetitions of the first uplink communication and provides an implicit acknowledgment of successful receipt of the first TB, where the second resource grant indicates that the UE is to cancel further repetitions of the first TB based on whether one or more of the first resource grant or the second resource grant schedules multiple TBs.

In some examples, the uplink resource manager 1310 may determine resources for a first instance of one or more repetitions of the second resource grant based on a threshold time period following a first repetition of the two or more TBs scheduled by the first resource grant. In some examples, the uplink resource manager 1310 may monitor for a first repetition of the second uplink communication in an uplink resource that corresponds to a first instance available for transmission of the second uplink communication after the threshold time period following the first repetition of the first TB. In some examples, the uplink resource manager 1310 may monitor for a first repetition of the second uplink communication in an uplink resource that corresponds to a first instance available for transmission of the second uplink communication based on the second resource grant.

The uplink communication manager 1315 may receive, from the UE, one or more repetitions of the first uplink communication. In some examples, the uplink communication manager 1315 may disregard one or more further repetitions of the first TB when one or more of the first resource grant or the second resource grant schedules multiple TBs. In some examples, the uplink communication manager 1315 may monitor for the second uplink communication using at least a portion of resources of the one or more remaining repetitions of the first uplink communication based on the first resource grant and the second resource grant each scheduling a single TB.

The repetition manager 1320 may determine to cancel one or more remaining repetitions of the first uplink communication based on successfully decoding at least a first TB of the first uplink communication. In some cases, the second resource grant is transmitted responsive to determining that each TB of two or more TBs scheduled by the first resource grant are successfully decoded at the base station.

The configuration manager 1325 may transmit, to the UE, configuration information that enables resource grants for multiple TBs, where cancellation of repetitions based on implicit acknowledgment of TBs is disabled based on the configuration information that enables resource grants for multiple TBs, and where cancellation of repetitions based on implicit acknowledgment of TBs is enabled based on configuration information that disables resource grants for multiple TBs.

The feedback manager 1330 may determine whether one or more TBs are successfully decoded. In some cases, the second resource grant provides an indication that each of the two or more TBs have been successfully decoded based on the second resource grant indicating a second set of feedback process identifications (FPIs), where each FPI of the second set of FPIs either is not included in a first set of FPIs in the first resource grant, or is included in the first set of FPIs and has a different new data indicator. In some cases, the second resource grant provides an indication that the first TB of a first set of TBs scheduled by the first resource grant has been successfully decoded, and where further repetitions of the first TB are canceled and the UE continues to transmit one or more repetitions of a second TB of the first set of TBs that is unacknowledged by the base station.

In some cases, the acknowledgment of successful decoding of the first TB is indicated by a first feedback process identification and a first new data indicator value provided in the second resource grant, where the first TB is indicated to be acknowledged when the second resource grant includes the first feedback process identification with a different new data indicator than the first new data indicator value, or when the second resource grant does not include the first feedback process identification.

The timing manager 1335 may monitor for a first repetition of the second uplink communication in an uplink resource that is after at least a threshold time period following the second resource grant. In some examples, the timing manager 1335 may discontinue monitoring for one or more repetitions of the first uplink communication in uplink resources starting at a first instance available for transmission of the first TB after the second resource grant when successful receipt of each TB of the first uplink communication is acknowledged.

In some examples, the timing manager 1335 may monitor for one or more repetitions of the first uplink communication up to a first instance available for transmission of the second transport block based on the second resource grant when successful receipt of less than all transport blocks of the first uplink communication is acknowledged. In some examples, the timing manager 1335 may discontinue monitoring for one or more repetitions of the first uplink communication in uplink resources starting at a first instance available for transmission of the first TB following the second resource grant when successful receipt of the first TB is acknowledged.

In some examples, the timing manager 1335 may monitoring for one or more repetitions of the first uplink communication in uplink resources up to a first instance available for transmission of the second uplink communication based on the second resource grant when successful receipt of the first TB is unacknowledged. In some examples, the timing manager 1335 may monitor for one or more repetitions of the first uplink communication up to a latest transport block of the first uplink communication for which successful receipt is unacknowledged, and discontinuing monitoring for the one or more repetitions of the first uplink communication starting after the latest transport block of the first uplink communication for which successful receipt is unacknowledged.

Figure 14:
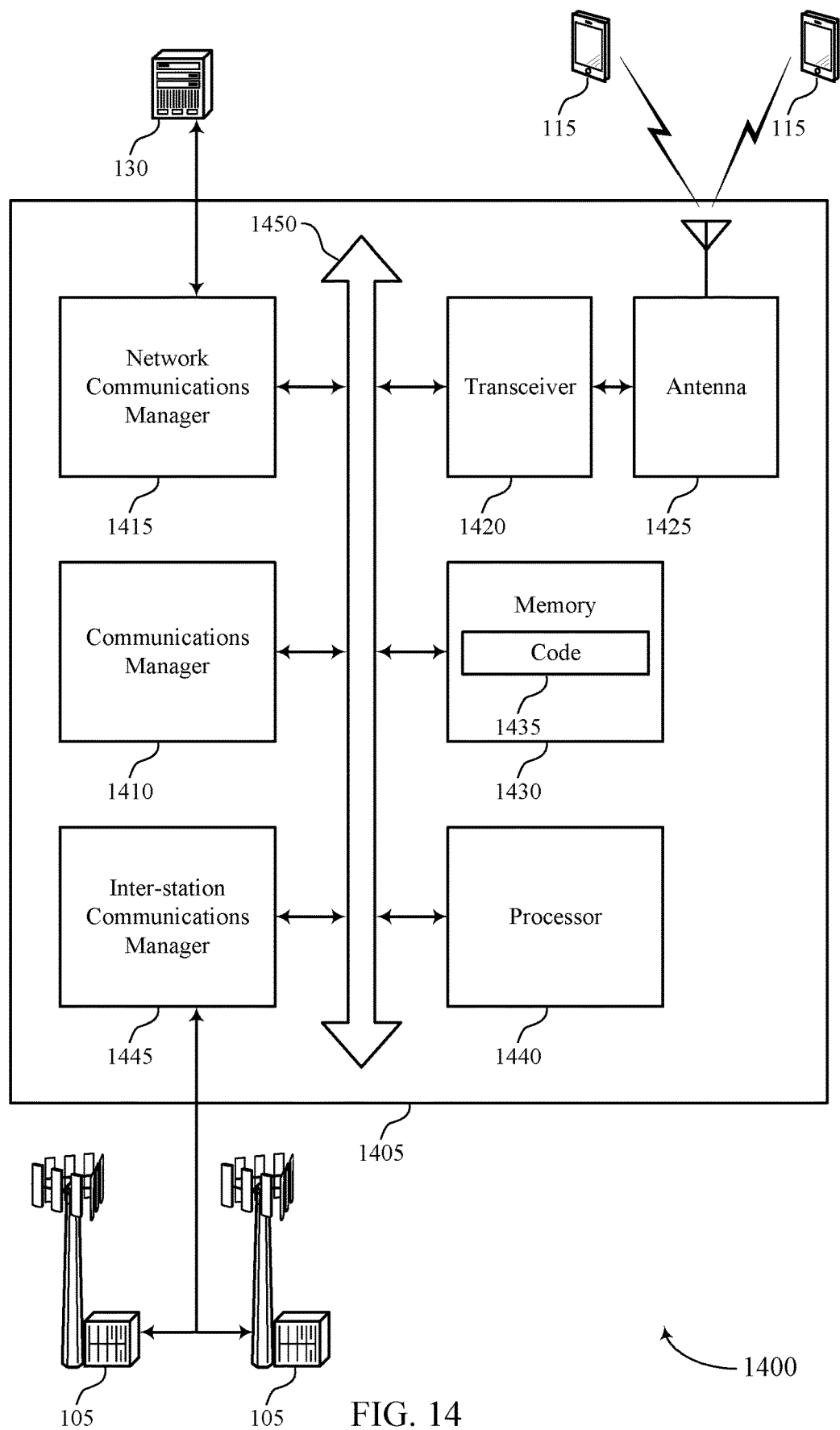
FIG. 14 shows a diagram of a system including a device that supports early termination of uplink communication repetitions with multiple TBs in accordance with aspects of the present disclosure.

FIG. 14 shows a diagram of a system 1400 including a device 1405 that supports early termination of uplink communication repetitions with multiple TBs in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE a first resource grant for one or more repetitions of a first uplink communication to be transmitted by the UE, transmit, to the UE, a second resource grant for a second uplink communication that at least partially overlaps with resources for one or more repetitions of the first uplink communication and provides an implicit acknowledgment of successful receipt of the first TB, where the second resource grant indicates that the UE is to cancel further repetitions of the first TB based on whether one or more of the first resource grant or the second resource grant schedules multiple TBs, receive, from the UE, one or more repetitions of the first uplink communication, and determine to cancel one or more remaining repetitions of the first uplink communication based on successfully decoding at least a first TB of the first uplink communication.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting early termination of uplink communication repetitions with multiple TBs).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
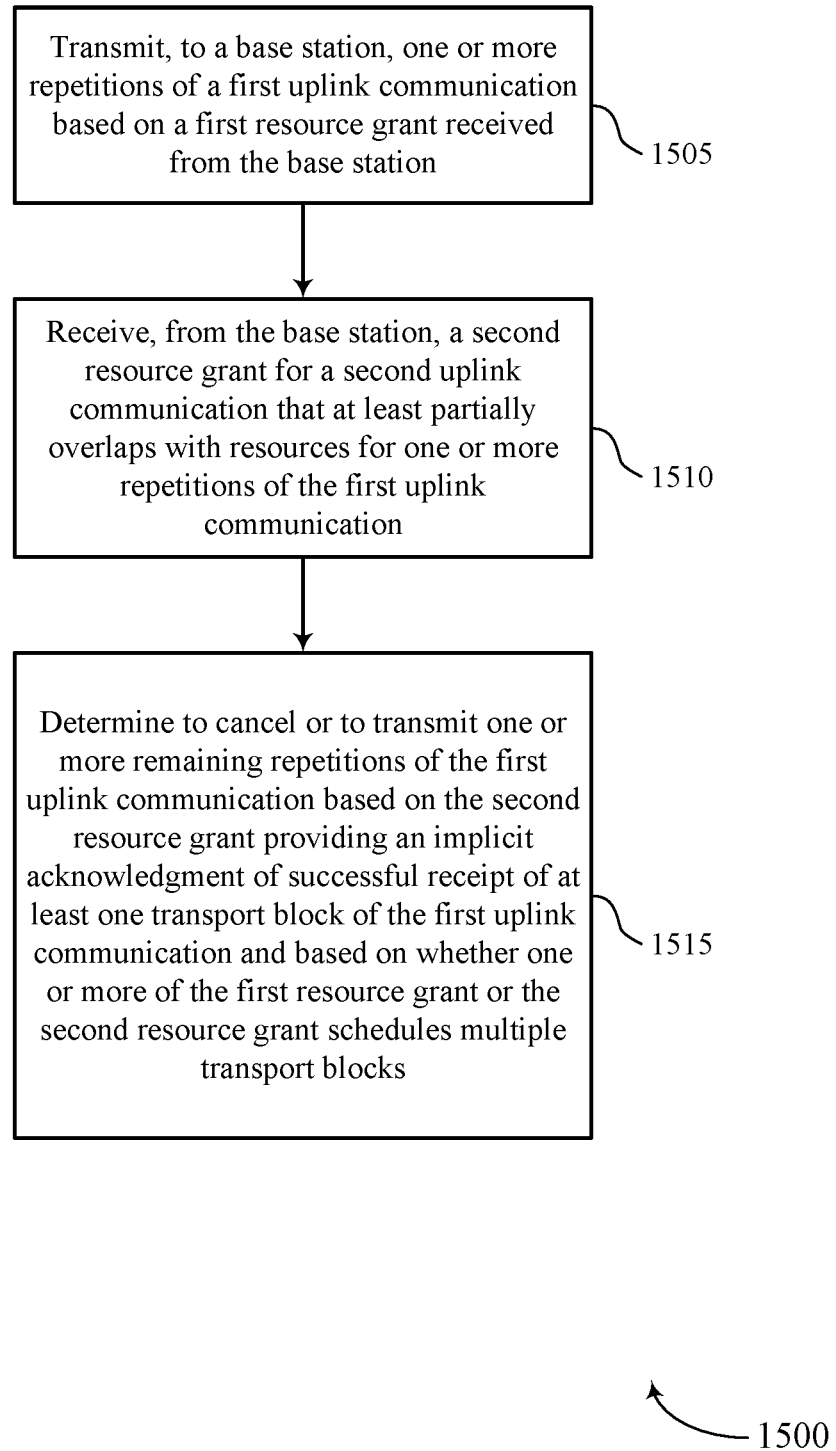
FIGS. 15 through 23 show flowcharts illustrating methods that support early termination of uplink communication repetitions with multiple TBs in accordance with aspects of the present disclosure.

FIG. 15 shows a flowchart illustrating a method 1500 that supports early termination of uplink communication repetitions with multiple TBs in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may transmit, to a base station, one or more repetitions of a first uplink communication based on a first resource grant received from the base station. The operations of 1505 may be performed according to the methods described herein. In some examples, aspects of the operations of 1505 may be performed by an uplink communication manager as described with reference to FIGS. 7 through 10.

At 1510, the UE may receive, from the base station, a second resource grant for a second uplink communication that at least partially overlaps with resources for one or more repetitions of the first uplink communication. The operations of 1510 may be performed according to the methods described herein. In some examples, aspects of the operations of 1510 may be performed by an uplink resource manager as described with reference to FIGS. 7 through 10.

At 1515, the UE may determine to cancel or to transmit one or more remaining repetitions of the first uplink communication based on the second resource grant providing an implicit acknowledgment of successful receipt of at least one TB of the first uplink communication and based on whether one or more of the first resource grant or the second resource grant schedules multiple TBs. The operations of 1515 may be performed according to the methods described herein. In some examples, aspects of the operations of 1515 may be performed by a repetition manager as described with reference to FIGS. 7 through 10.

Figure 16:
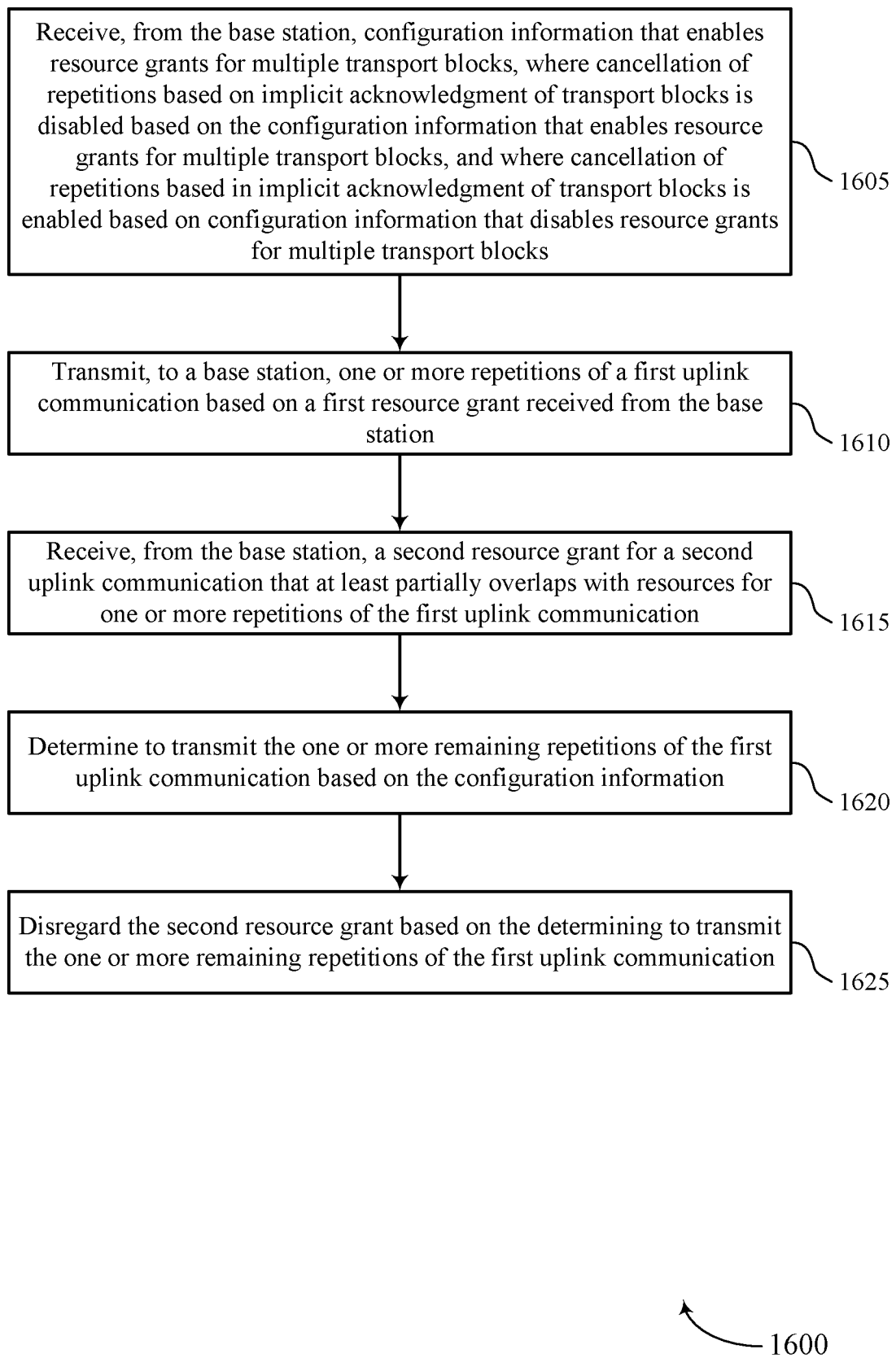

FIG. 16 shows a flowchart illustrating a method 1600 that supports early termination of uplink communication repetitions with multiple TBs in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive, from the base station, configuration information that enables resource grants for multiple TBs, where cancellation of repetitions based on implicit acknowledgment of TBs is disabled based on the configuration information that enables resource grants for multiple TBs, and where cancellation of repetitions based on implicit acknowledgment of TBs is enabled based on configuration information that disables resource grants for multiple TBs. The operations of 1605 may be performed according to the methods described herein. In some examples, aspects of the operations of 1605 may be performed by a configuration manager as described with reference to FIGS. 7 through 10.

At 1610, the UE may transmit, to a base station, one or more repetitions of a first uplink communication based on a first resource grant received from the base station. The operations of 1610 may be performed according to the methods described herein. In some examples, aspects of the operations of 1610 may be performed by an uplink communication manager as described with reference to FIGS. 7 through 10.

At 1615, the UE may receive, from the base station, a second resource grant for a second uplink communication that at least partially overlaps with resources for one or more repetitions of the first uplink communication. The operations of 1615 may be performed according to the methods described herein. In some examples, aspects of the operations of 1615 may be performed by an uplink resource manager as described with reference to FIGS. 7 through 10.

At 1620, the UE may determine to transmit the one or more remaining repetitions of the first uplink communication based on the configuration information. The operations of 1620 may be performed according to the methods described herein. In some examples, aspects of the operations of 1620 may be performed by a configuration manager as described with reference to FIGS. 7 through 10.

At 1625, the UE may disregard the second resource grant based on the determining to transmit the one or more remaining repetitions of the first uplink communication. The operations of 1625 may be performed according to the methods described herein. In some examples, aspects of the operations of 1625 may be performed by a configuration manager as described with reference to FIGS. 7 through 10.

Figure 17:
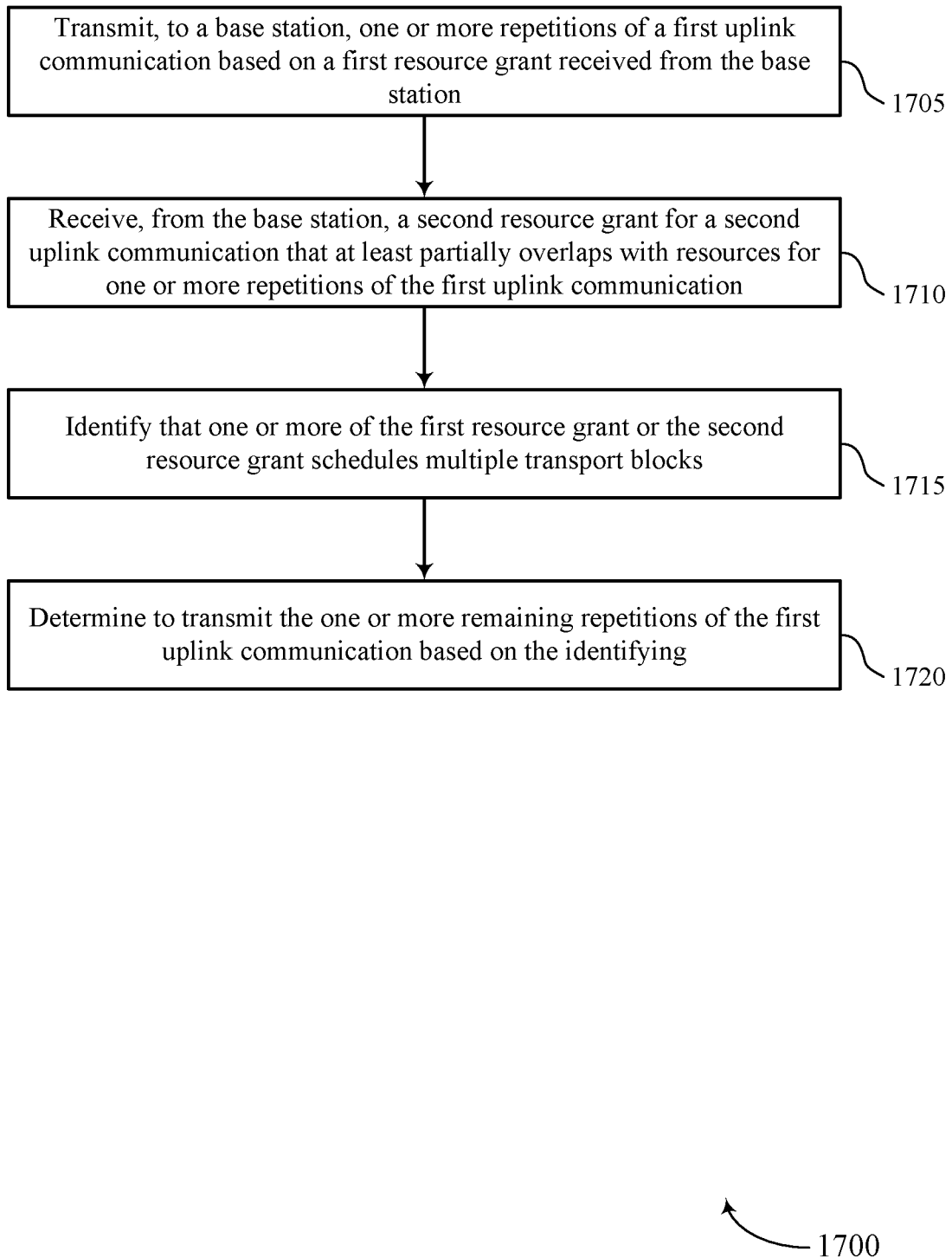

FIG. 17 shows a flowchart illustrating a method 1700 that supports early termination of uplink communication repetitions with multiple TBs in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may transmit, to a base station, one or more repetitions of a first uplink communication based on a first resource grant received from the base station. The operations of 1705 may be performed according to the methods described herein. In some examples, aspects of the operations of 1705 may be performed by an uplink communication manager as described with reference to FIGS. 7 through 10.

At 1710, the UE may receive, from the base station, a second resource grant for a second uplink communication that at least partially overlaps with resources for one or more repetitions of the first uplink communication. The operations of 1710 may be performed according to the methods described herein. In some examples, aspects of the operations of 1710 may be performed by an uplink resource manager as described with reference to FIGS. 7 through 10.

At 1715, the UE may identify that one or more of the first resource grant or the second resource grant schedules multiple TBs. The operations of 1715 may be performed according to the methods described herein. In some examples, aspects of the operations of 1715 may be performed by a TB identification manager as described with reference to FIGS. 7 through 10.

At 1720, the UE may determine to transmit the one or more remaining repetitions of the first uplink communication based on the identifying. The operations of 1720 may be performed according to the methods described herein. In some examples, aspects of the operations of 1720 may be performed by a TB identification manager as described with reference to FIGS. 7 through 10.

Figure 18:
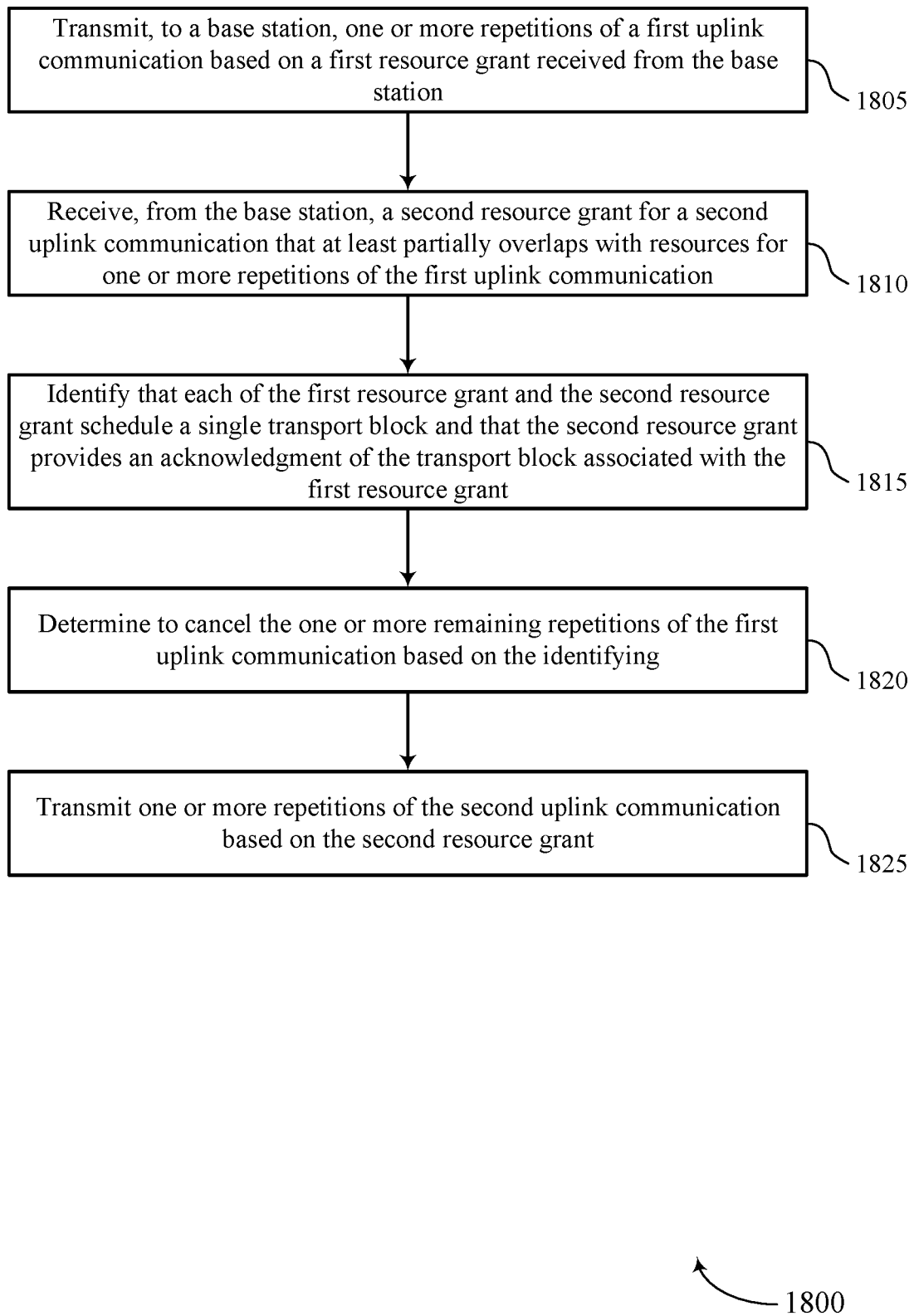

FIG. 18 shows a flowchart illustrating a method 1800 that supports early termination of uplink communication repetitions with multiple TBs in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1805, the UE may transmit, to a base station, one or more repetitions of a first uplink communication based on a first resource grant received from the base station. The operations of 1805 may be performed according to the methods described herein. In some examples, aspects of the operations of 1805 may be performed by an uplink communication manager as described with reference to FIGS. 7 through 10.

At 1810, the UE may receive, from the base station, a second resource grant for a second uplink communication that at least partially overlaps with resources for one or more repetitions of the first uplink communication. The operations of 1810 may be performed according to the methods described herein. In some examples, aspects of the operations of 1810 may be performed by an uplink resource manager as described with reference to FIGS. 7 through 10.

At 1815, the UE may identify that each of the first resource grant and the second resource grant schedule a single TB and that the second resource grant provides an acknowledgment of the TB associated with the first resource grant. The operations of 1815 may be performed according to the methods described herein. In some examples, aspects of the operations of 1815 may be performed by a TB identification manager as described with reference to FIGS. 7 through 10.

At 1820, the UE may determine to cancel the one or more remaining repetitions of the first uplink communication based on the identifying. The operations of 1820 may be performed according to the methods described herein. In some examples, aspects of the operations of 1820 may be performed by a repetition manager as described with reference to FIGS. 7 through 10.

At 1825, the UE may transmit one or more repetitions of the second uplink communication based on the second resource grant. The operations of 1825 may be performed according to the methods described herein. In some examples, aspects of the operations of 1825 may be performed by a repetition manager as described with reference to FIGS. 7 through 10.

Figure 19:
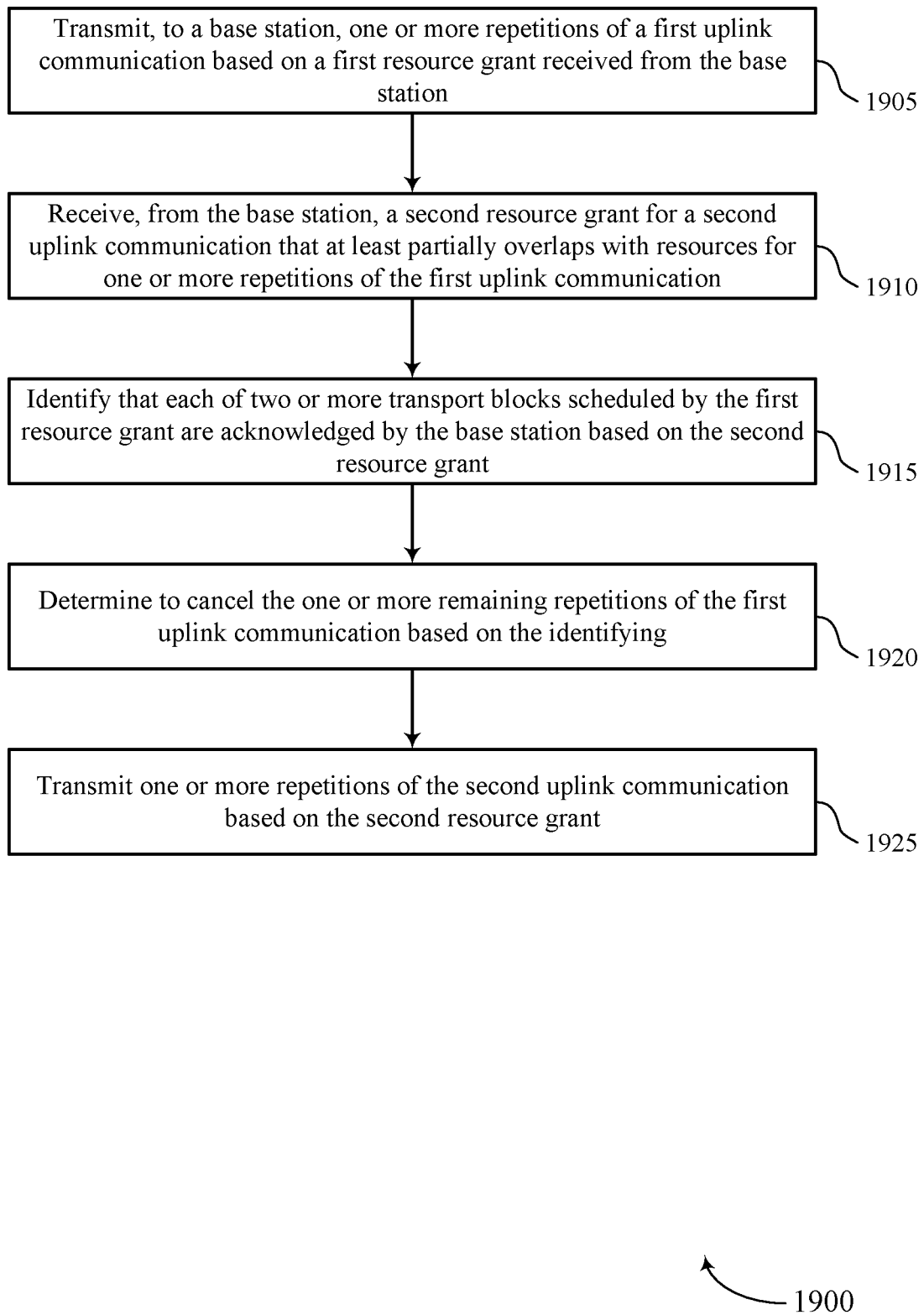

FIG. 19 shows a flowchart illustrating a method 1900 that supports early termination of uplink communication repetitions with multiple TBs in accordance with aspects of the present disclosure. The operations of method 1900 may be implemented by a UE 115 or its components as described herein. For example, the operations of method 1900 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1905, the UE may transmit, to a base station, one or more repetitions of a first uplink communication based on a first resource grant received from the base station. The operations of 1905 may be performed according to the methods described herein. In some examples, aspects of the operations of 1905 may be performed by an uplink communication manager as described with reference to FIGS. 7 through 10.

At 1910, the UE may receive, from the base station, a second resource grant for a second uplink communication that at least partially overlaps with resources for one or more repetitions of the first uplink communication. The operations of 1910 may be performed according to the methods described herein. In some examples, aspects of the operations of 1910 may be performed by an uplink resource manager as described with reference to FIGS. 7 through 10.

At 1915, the UE may identify that each of two or more TBs scheduled by the first resource grant are acknowledged by the base station based on the second resource grant. The operations of 1915 may be performed according to the methods described herein. In some examples, aspects of the operations of 1915 may be performed by a TB identification manager as described with reference to FIGS. 7 through 10.

At 1920, the UE may determine to cancel the one or more remaining repetitions of the first uplink communication based on the identifying. The operations of 1920 may be performed according to the methods described herein. In some examples, aspects of the operations of 1920 may be performed by a repetition manager as described with reference to FIGS. 7 through 10.

At 1925, the UE may transmit one or more repetitions of the second uplink communication based on the second resource grant. The operations of 1925 may be performed according to the methods described herein. In some examples, aspects of the operations of 1925 may be performed by a repetition manager as described with reference to FIGS. 7 through 10.

Figure 20:
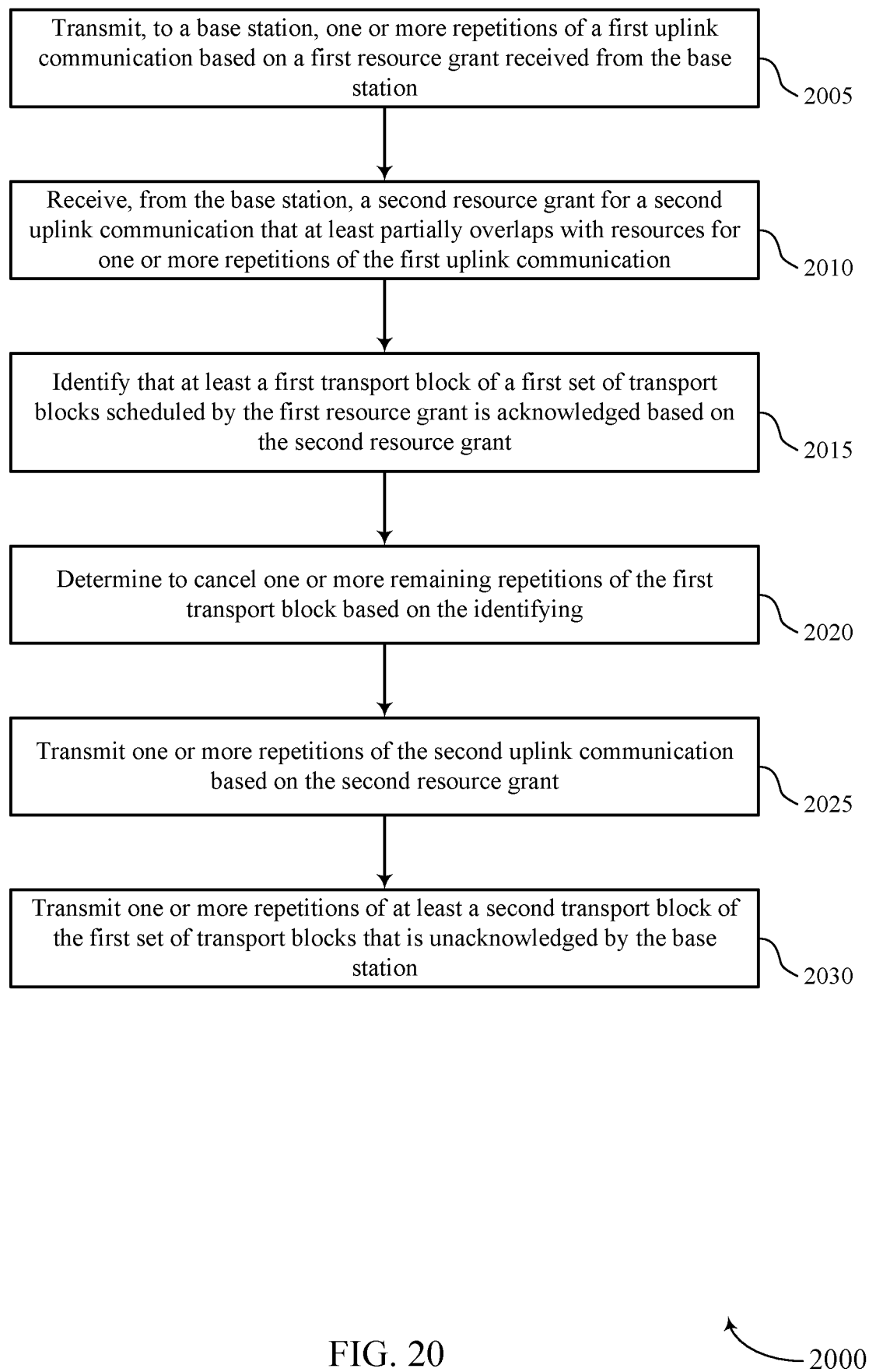

FIG. 20 shows a flowchart illustrating a method 2000 that supports early termination of uplink communication repetitions with multiple TBs in accordance with aspects of the present disclosure. The operations of method 2000 may be implemented by a UE 115 or its components as described herein. For example, the operations of method 2000 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2005, the UE may transmit, to a base station, one or more repetitions of a first uplink communication based on a first resource grant received from the base station. The operations of 2005 may be performed according to the methods described herein. In some examples, aspects of the operations of 2005 may be performed by an uplink communication manager as described with reference to FIGS. 7 through 10.

At 2010, the UE may receive, from the base station, a second resource grant for a second uplink communication that at least partially overlaps with resources for one or more repetitions of the first uplink communication. The operations of 2010 may be performed according to the methods described herein. In some examples, aspects of the operations of 2010 may be performed by an uplink resource manager as described with reference to FIGS. 7 through 10.

At 2015, the UE may identify that at least a first TB of a first set of TBs scheduled by the first resource grant is acknowledged based on the second resource grant. The operations of 2015 may be performed according to the methods described herein. In some examples, aspects of the operations of 2015 may be performed by a feedback manager as described with reference to FIGS. 7 through 10.

At 2020, the UE may determine to cancel one or more remaining repetitions of the first TB based on the identifying. The operations of 2020 may be performed according to the methods described herein. In some examples, aspects of the operations of 2020 may be performed by a repetition manager as described with reference to FIGS. 7 through 10.

At 2025, the UE may transmit one or more repetitions of the second uplink communication based on the second resource grant. The operations of 2025 may be performed according to the methods described herein. In some examples, aspects of the operations of 2025 may be performed by a repetition manager as described with reference to FIGS. 7 through 10.

At 2030, the UE may transmit one or more repetitions of at least a second TB of the first set of TBs that is unacknowledged by the base station. The operations of 2030 may be performed according to the methods described herein. In some examples, aspects of the operations of 2030 may be performed by a repetition manager as described with reference to FIGS. 7 through 10.

Figure 21:
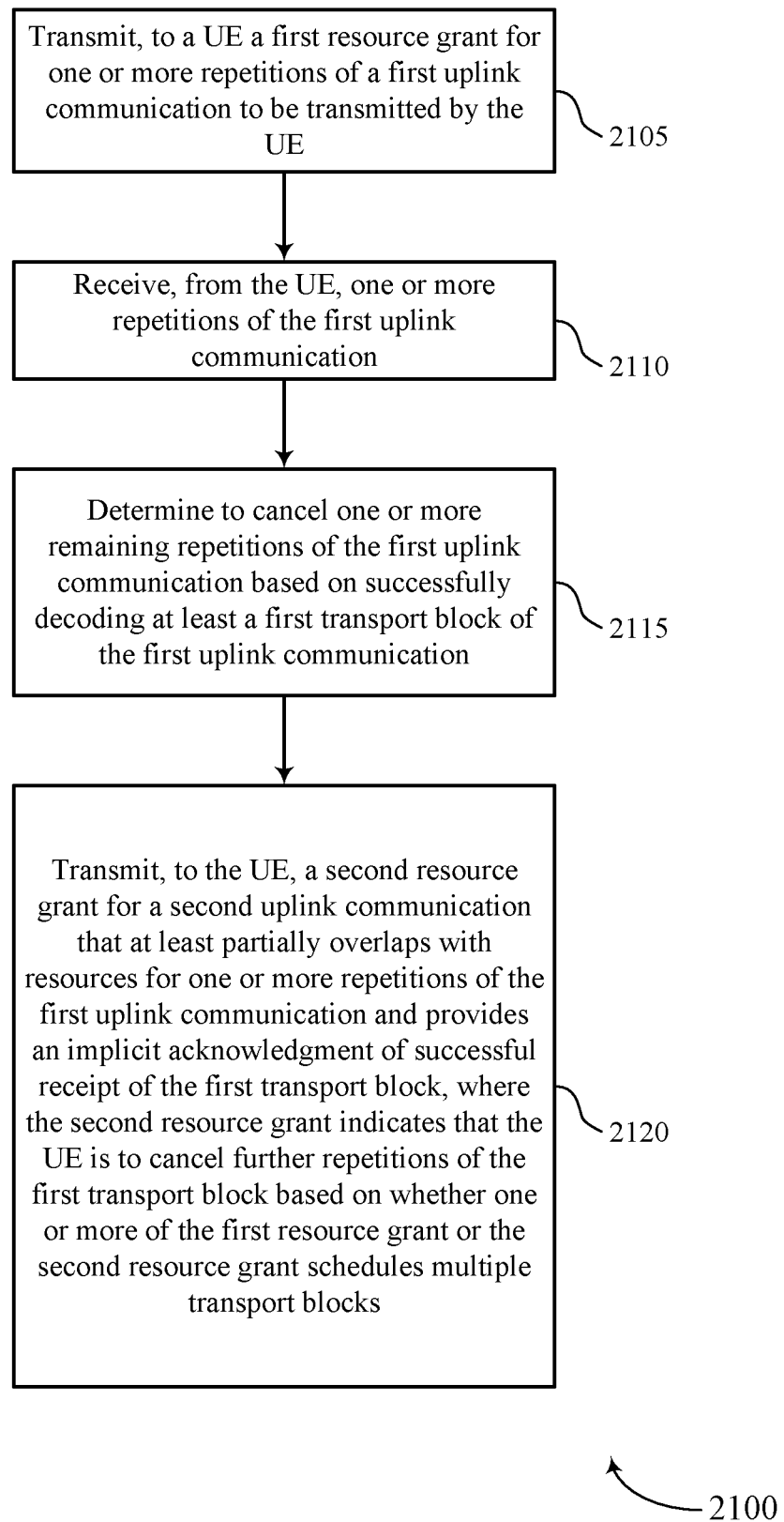

FIG. 21 shows a flowchart illustrating a method 2100 that supports early termination of uplink communication repetitions with multiple TBs in accordance with aspects of the present disclosure. The operations of method 2100 may be implemented by a base station 105 or its components as described herein. For example, the operations of method 2100 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2105, the base station may transmit, to a UE a first resource grant for one or more repetitions of a first uplink communication to be transmitted by the UE. The operations of 2105 may be performed according to the methods described herein. In some examples, aspects of the operations of 2105 may be performed by an uplink resource manager as described with reference to FIGS. 11 through 14.

At 2110, the base station may receive, from the UE, one or more repetitions of the first uplink communication. The operations of 2110 may be performed according to the methods described herein. In some examples, aspects of the operations of 2110 may be performed by an uplink communication manager as described with reference to FIGS. 11 through 14.

At 2115, the base station may determine to cancel one or more remaining repetitions of the first uplink communication based on successfully decoding at least a first TB of the first uplink communication. The operations of 2115 may be performed according to the methods described herein. In some examples, aspects of the operations of 2115 may be performed by a repetition manager as described with reference to FIGS. 11 through 14.

At 2120, the base station may transmit, to the UE, a second resource grant for a second uplink communication that at least partially overlaps with resources for one or more repetitions of the first uplink communication and provides an implicit acknowledgment of successful receipt of the first TB, where the second resource grant indicates that the UE is to cancel further repetitions of the first TB based on whether one or more of the first resource grant or the second resource grant schedules multiple TBs. The operations of 2120 may be performed according to the methods described herein. In some examples, aspects of the operations of 2120 may be performed by an uplink resource manager as described with reference to FIGS. 11 through 14.

Figure 22:
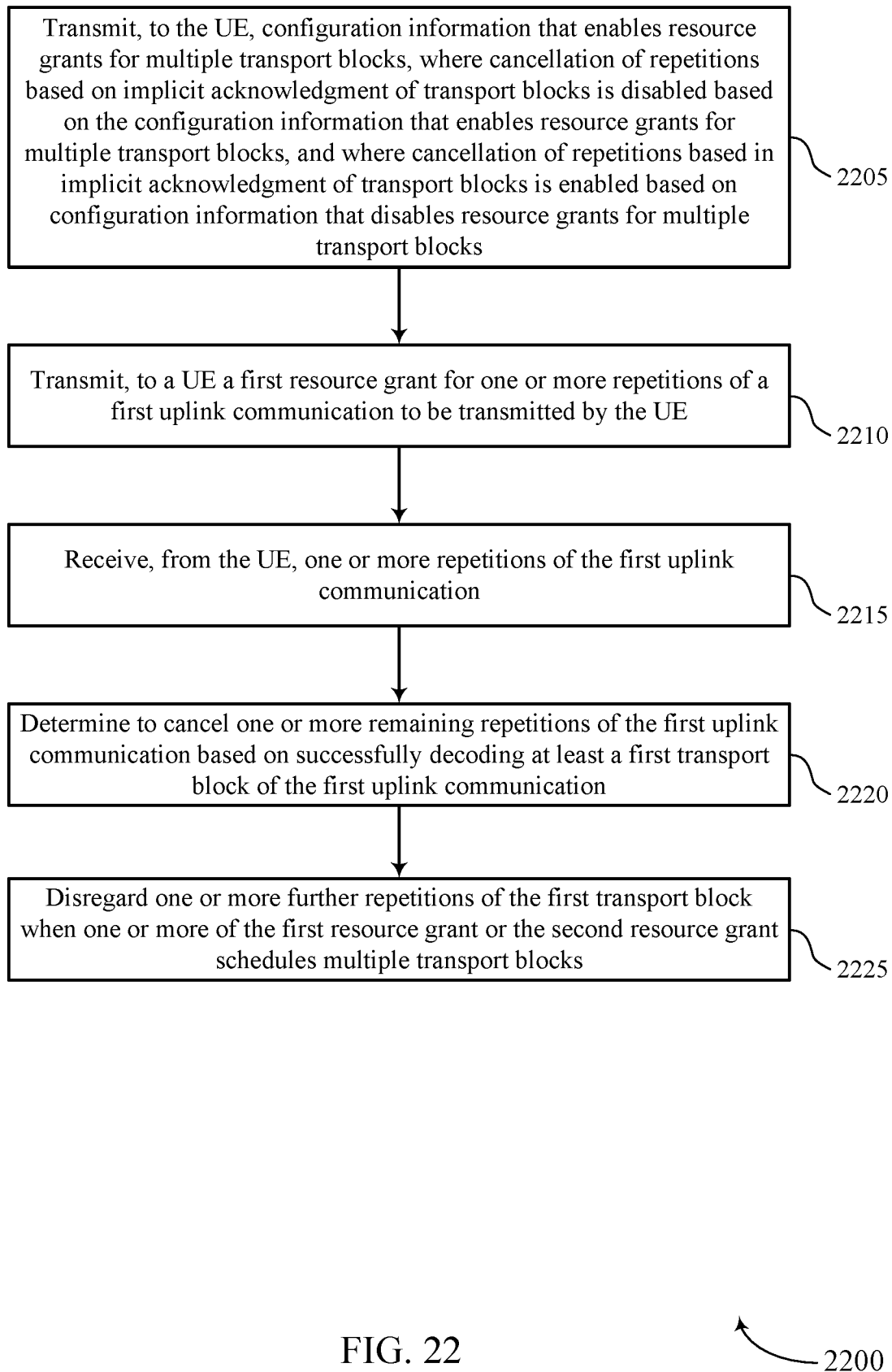

FIG. 22 shows a flowchart illustrating a method 2200 that supports early termination of uplink communication repetitions with multiple TBs in accordance with aspects of the present disclosure. The operations of method 2200 may be implemented by a base station 105 or its components as described herein. For example, the operations of method 2200 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2205, the base station may transmit, to the UE, configuration information that enables resource grants for multiple TBs, where cancellation of repetitions based on implicit acknowledgment of TBs is disabled based on the configuration information that enables resource grants for multiple TBs, and where cancellation of repetitions based on implicit acknowledgment of TBs is enabled based on configuration information that disables resource grants for multiple TBs. The operations of 2205 may be performed according to the methods described herein. In some examples, aspects of the operations of 2205 may be performed by a configuration manager as described with reference to FIGS. 11 through 14.

At 2210, the base station may transmit, to a UE a first resource grant for one or more repetitions of a first uplink communication to be transmitted by the UE. The operations of 2210 may be performed according to the methods described herein. In some examples, aspects of the operations of 2210 may be performed by an uplink resource manager as described with reference to FIGS. 11 through 14.

At 2215, the base station may receive, from the UE, one or more repetitions of the first uplink communication. The operations of 2215 may be performed according to the methods described herein. In some examples, aspects of the operations of 2215 may be performed by an uplink communication manager as described with reference to FIGS. 11 through 14.

At 2220, the base station may determine to cancel one or more remaining repetitions of the first uplink communication based on successfully decoding at least a first TB of the first uplink communication. The operations of 2220 may be performed according to the methods described herein. In some examples, aspects of the operations of 2220 may be performed by a repetition manager as described with reference to FIGS. 11 through 14.

At 2225, the base station may disregard one or more further repetitions of the first TB when one or more of the first resource grant or the second resource grant schedules multiple TBs. The operations of 2225 may be performed according to the methods described herein. In some examples, aspects of the operations of 2225 may be performed by an uplink communication manager as described with reference to FIGS. 11 through 14.

Figure 23:
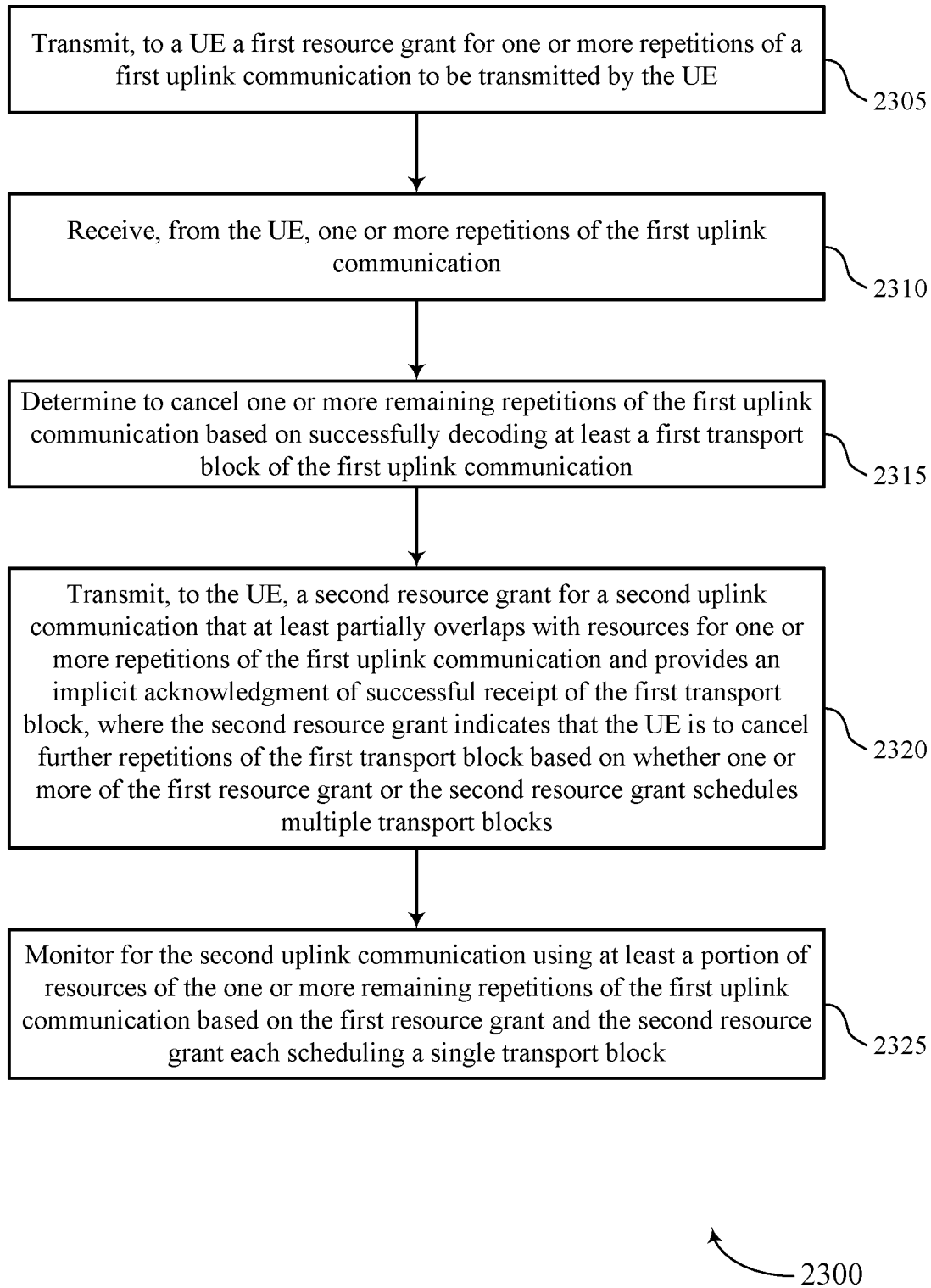

FIG. 23 shows a flowchart illustrating a method 2300 that supports early termination of uplink communication repetitions with multiple TBs in accordance with aspects of the present disclosure. The operations of method 2300 may be implemented by a base station 105 or its components as described herein. For example, the operations of method 2300 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2305, the base station may transmit, to a UE a first resource grant for one or more repetitions of a first uplink communication to be transmitted by the UE. The operations of 2305 may be performed according to the methods described herein. In some examples, aspects of the operations of 2305 may be performed by an uplink resource manager as described with reference to FIGS. 11 through 14.

At 2310, the base station may receive, from the UE, one or more repetitions of the first uplink communication. The operations of 2310 may be performed according to the methods described herein. In some examples, aspects of the operations of 2310 may be performed by an uplink communication manager as described with reference to FIGS. 11 through 14.

At 2315, the base station may determine to cancel one or more remaining repetitions of the first uplink communication based on successfully decoding at least a first TB of the first uplink communication. The operations of 2315 may be performed according to the methods described herein. In some examples, aspects of the operations of 2315 may be performed by a repetition manager as described with reference to FIGS. 11 through 14.

At 2320, the base station may transmit, to the UE, a second resource grant for a second uplink communication that at least partially overlaps with resources for one or more repetitions of the first uplink communication and provides an implicit acknowledgment of successful receipt of the first TB, where the second resource grant indicates that the UE is to cancel further repetitions of the first TB based on whether one or more of the first resource grant or the second resource grant schedules multiple TBs. The operations of 2320 may be performed according to the methods described herein. In some examples, aspects of the operations of 2320 may be performed by an uplink resource manager as described with reference to FIGS. 11 through 14.

At 2325, the base station may monitor for the second uplink communication using at least a portion of resources of the one or more remaining repetitions of the first uplink communication based on the first resource grant and the second resource grant each scheduling a single TB. The operations of 2325 may be performed according to the methods described herein. In some examples, aspects of the operations of 2325 may be performed by an uplink communication manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: transmitting, to a base station, one or more repetitions of a first uplink communication based at least in part on a first resource grant received from the base station; receiving, from the base station, a second resource grant for a second uplink communication that at least partially overlaps with resources for one or more repetitions of the first uplink communication; and determining to cancel or to transmit one or more remaining repetitions of the first uplink communication based at least in part on the second resource grant providing an implicit acknowledgment of successful receipt of at least one transport block of the first uplink communication and based at least in part on whether one or more of the first resource grant or the second resource grant schedules multiple transport blocks.

Aspect 2: The method of aspect 1, wherein the determining comprises: identifying that each of two or more transport blocks scheduled by the first resource grant are acknowledged by the base station based at least in part on the second resource grant; determining to cancel the one or more remaining repetitions of the first uplink communication based at least in part on the identifying; and transmitting one or more repetitions of the second uplink communication based at least in part on the second resource grant.

Aspect 3: The method of aspect 2, wherein the two or more transport blocks scheduled by the first resource grant are each determined to be acknowledged by the base station based at least in part on the second resource grant indicating a second set of feedback process identifications (FPIs), wherein each FPI of the second set of FPIs either is not included in a first set of FPIs in the first resource grant, or is included in the first set of FPIs and has a different new data indicator.

Aspect 4: The method of any of aspects 2 through 3, wherein the determining further comprises: determining that the one or more repetitions of the second resource grant are scheduled to be transmitted after at least a threshold time period following a first repetition of the two or more transport blocks scheduled by the first resource grant.

Aspect 5: The method of any of aspects 1 through 4, further comprising: receiving, from the base station, configuration information that enables acknowledgment of transport blocks based on a toggled new data indicator provided in the second resource grant.

Aspect 6: The method of any of aspects 1 through 5, further comprising: receiving, from the base station, configuration information that enables resource grants for multiple transport blocks, wherein cancellation of repetitions based on implicit acknowledgment of transport blocks is disabled based on the configuration information that enables resource grants for multiple transport blocks, and wherein cancellation of repetitions based on implicit acknowledgment of transport blocks is enabled based on configuration information that disables resource grants for multiple transport blocks.

Aspect 7: The method of aspect 6, wherein the determining comprises: determining to transmit the one or more remaining repetitions of the first uplink communication based at least in part on the configuration information; and disregarding the second resource grant based at least in part on the determining to transmit the one or more remaining repetitions of the first uplink communication.

Aspect 8: The method of aspect 1, wherein the determining comprises: identifying that one or more of the first resource grant or the second resource grant schedules multiple transport blocks; and determining to transmit the one or more remaining repetitions of the first uplink communication based at least in part on the identifying.

Aspect 9: The method of aspect 1, wherein the determining comprises: identifying that each of the first resource grant and the second resource grant schedule a single transport block and that the second resource grant provides an acknowledgment of the transport block associated with the first resource grant; determining to cancel the one or more remaining repetitions of the first uplink communication based at least in part on the identifying; and transmitting one or more repetitions of the second uplink communication based at least in part on the second resource grant.

Aspect 10: The method of aspect 1, wherein the determining comprises: identifying that at least a first transport block of a first plurality of transport blocks scheduled by the first resource grant is acknowledged based at least in part on the second resource grant; determining to cancel one or more remaining repetitions of the first transport block based at least in part on the identifying; transmitting one or more repetitions of the second uplink communication based at least in part on the second resource grant, wherein the second uplink communication comprises one or more repetitions of at least a second transport block of the first plurality of transport blocks that is unacknowledged by the base station.

Aspect 11: The method of aspect 10, wherein the first transport block is associated with a first feedback process identification and a first new data indicator value and the first transport block is determined to be acknowledged based at least in part on the second resource grant including the first feedback process identification with a different new data indicator than the first new data indicator value, or the first transport block is determined to be acknowledged based at least in part the first feedback process identification not being included in the second resource grant.

Aspect 12: The method of any of aspects 10 through 11, further comprising: delivering an acknowledgment indication for the first transport block from a physical layer of a protocol stack at the UE to a higher layer of the protocol stack.

Aspect 13: The method of any of aspects 10 through 12, wherein the determining to cancel the one or more remaining repetitions of the first transport block further comprises: determining a timing for transmitting a first repetition of the second transport block that is after at least a threshold time period following the second resource grant.

Aspect 14: The method of any of aspects 10 through 13, wherein the determining to cancel the one or more remaining repetitions of the first transport block further comprises: determining that the second uplink communication is to be transmitted using resources that overlap with the first uplink communication.

Aspect 15: The method of any of aspects 10 through 14, wherein a timing for cancelling the one or more remaining repetitions of the first uplink communication corresponds to a time period from a first instance available for transmission of the first transport block after receiving the second resource grant to a first uplink resource allocated by the second resource grant.

Aspect 16: The method of any of aspects 10 through 15, wherein a timing for cancelling the one or more remaining repetitions of the first uplink communication corresponds to a first instance available for transmission of the second transport block based on the second resource grant.

Aspect 17: The method of any of aspects 10 through 16, wherein a timing for cancelling the one or more remaining repetitions of the first uplink communication corresponds to a first instance available for transmission of the first transport block after the second resource grant when successful receipt of each transport block of the first uplink communication is acknowledged, or the timing for cancelling the one or more remaining repetitions of the first uplink communication corresponds to a first instance available for transmission of the second transport block based on the second resource grant when successful receipt of less than all transport blocks of the first uplink communication is acknowledged.

Aspect 18: The method of any of aspects 10 through 16, wherein a timing for cancelling the one or more remaining repetitions of the first uplink communication corresponds to a first instance available for transmission of the first transport block when successful receipt of the first transport block is acknowledged; and the timing for cancelling the one or more remaining repetitions of the first uplink communication corresponds to a first instance available for transmission of the second transport block based on the second resource grant when successful receipt of the first transport block is unacknowledged.

Aspect 19: The method of any of aspects 10 through 16, wherein a timing for cancelling the one or more remaining repetitions of the first uplink communication corresponds to a first instance available for transmission of the second transport block after a transmission of a latest transport block of the first uplink communication for which successful receipt is unacknowledged.

Aspect 20: The method of any of aspects 1 through 19, wherein the determining to cancel or to transmit the one or more remaining repetitions of the first uplink communication is further determined based at least in part on whether multiple transport blocks scheduled by the first resource grant are interleaved or are non-interleaved.

Aspect 21: The method of any of aspects 1 through 20, wherein the second resource grant for the second uplink communication at least partially overlaps in time with the resources for one or more repetitions of the first uplink communication.

Aspect 22: A method for wireless communication at a base station, comprising: transmitting, to a UE a first resource grant for one or more repetitions of a first uplink communication to be transmitted by the UE; receiving, from the UE, one or more repetitions of the first uplink communication; determining to cancel one or more remaining repetitions of the first uplink communication based at least in part on successfully decoding at least a first transport block of the first uplink communication; and transmitting, to the UE, a second resource grant for a second uplink communication that at least partially overlaps with resources for one or more repetitions of the first uplink communication and provides an implicit acknowledgment of successful receipt of the first transport block, wherein the second resource grant indicates that the UE is to cancel further repetitions of the first transport block based at least in part on whether one or more of the first resource grant or the second resource grant schedules multiple transport blocks.

Aspect 23: The method of aspect 22, wherein the second resource grant is transmitted responsive to determining that each transport block of two or more transport blocks scheduled by the first resource grant are successfully decoded at the base station.

Aspect 24: The method of aspect 23, wherein the second resource grant provides an indication that each of the two or more transport blocks have been successfully decoded based at least in part on the second resource grant indicating a second set of feedback process identifications (FPIs), each FPI of the second set of FPIs either is not included in a first set of FPIs in the first resource grant, or is included in the first set of FPIs and has a different new data indicator.

Aspect 25: The method of any of aspects 23 through 24, further comprising: determining resources for a first instance of one or more repetitions of the second resource grant based at least in part on a threshold time period following a first repetition of the two or more transport blocks scheduled by the first resource grant.

Aspect 26: The method of any of aspects 22 through 25, further comprising: transmitting, to the UE, configuration information that enables resource grants for multiple transport blocks, wherein cancellation of repetitions based on implicit acknowledgment of transport blocks is disabled based on the configuration information that enables resource grants for multiple transport blocks, and wherein cancellation of repetitions based on implicit acknowledgment of transport blocks is enabled based on configuration information that disables resource grants for multiple transport blocks.

Aspect 27: The method of any of aspects 22 through 25, further comprising: disregarding one or more further repetitions of the first transport block when one or more of the first resource grant or the second resource grant schedules multiple transport blocks.

Aspect 28: The method of any of aspects 22 through 25, further comprising: monitoring for the second uplink communication using at least a portion of resources of the one or more remaining repetitions of the first uplink communication based at least in part on the first resource grant and the second resource grant each scheduling a single transport block.

Aspect 29: The method of any of aspects 22 through 25, wherein the second resource grant provides an indication that the first transport block of a first plurality of transport blocks scheduled by the first resource grant has been successfully decoded, and further repetitions of the first transport block are canceled and the UE continues to transmit one or more repetitions of a second transport block of the first plurality of transport blocks that is unacknowledged by the base station.

Aspect 30: The method of aspect 29, wherein the acknowledgment of successful decoding of the first transport block is indicated by a first feedback process identification and a first new data indicator value provided in the second resource grant, where the first transport block is indicated to be acknowledged when the second resource grant includes the first feedback process identification with a different new data indicator than the first new data indicator value, or when the second resource grant does not include the first feedback process identification.

Aspect 31: The method of any of aspects 29 through 30, further comprising: monitoring for a first repetition of the second uplink communication in an uplink resource that is after at least a threshold time period following the second resource grant.

Aspect 32: The method of aspect 31, further comprising: monitoring for a first repetition of the second uplink communication in an uplink resource that corresponds to a first instance available for transmission of the second uplink communication after the threshold time period following the second resource grant.

Aspect 33: The method of any of aspects 31 through 32, further comprising: monitoring for a first repetition of the second uplink communication in an uplink resource that corresponds to a first instance available for transmission of the second uplink communication based on the second resource grant.

Aspect 34: The method of any of aspects 31 through 33, further comprising: discontinuing monitoring for one or more repetitions of the first uplink communication in uplink resources starting at a first instance available for transmission of the first transport block after the second resource grant when successful receipt of each transport block of the first uplink communication is acknowledged, or monitoring for one or more repetitions of the first uplink communication up to a first instance available for transmission of the second transport block based on the second resource grant when successful receipt of less than all transport blocks of the first uplink communication is acknowledged.

Aspect 35: The method of any of aspects 31 through 33, further comprising: discontinuing monitoring for one or more repetitions of the first uplink communication in uplink resources starting at a first instance available for transmission of the first transport block following the second resource grant when successful receipt of the first transport block is acknowledged; and monitoring for one or more repetitions of the first uplink communication in uplink resources up to a first instance available for transmission of the second uplink communication based on the second resource grant when successful receipt of the first transport block is unacknowledged.

Aspect 36: The method of any of aspects 31 through 33, further comprising: monitoring for one or more repetitions of the first uplink communication up to a latest transport block of the first uplink communication for which successful receipt is unacknowledged; and discontinuing monitoring for the one or more repetitions of the first uplink communication starting after the latest transport block of the first uplink communication for which successful receipt is unacknowledged.

Aspect 37: The method of any of aspects 22 through 33, wherein the second resource grant for the second uplink communication at least partially overlaps in time with the resources for one or more repetitions of the first uplink communication.

Aspect 38: An apparatus for wireless communication at a UE, comprising a processor; memory coupled with the processor; and instructions stored in the memory and executable by the processor to cause the apparatus to perform a method of any of aspects 1 through 21.

Aspect 39: An apparatus for wireless communication at a UE, comprising at least one means for performing a method of any of aspects 1 through 21.

Aspect 40: A non-transitory computer-readable medium storing code for wireless communication at a UE, the code comprising instructions executable by a processor to perform a method of any of aspects 1 through 21.

Aspect 41: An apparatus for wireless communication at a base station, comprising a processor; memory coupled with the processor; and instructions stored in the memory and executable by the processor to cause the apparatus to perform a method of any of aspects 22 through 37.

Aspect 42: An apparatus for wireless communication at a base station, comprising at least one means for performing a method of any of aspects 22 through 37.

Aspect 43: A non-transitory computer-readable medium storing code for wireless communication at a base station, the code comprising instructions executable by a processor to perform a method of any of aspects 22 through 37.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a network device, a first resource grant that schedules a first set of two or more transport blocks for a first uplink communication, the first resource grant indicating a first set of hybrid automatic repeat request (HARQ) process identifiers (IDs) associated with the first set of transport blocks, and the first resource grant indicating a respective new data indicator for each HARQ process ID of the first set of HARQ process IDs;
    transmitting, to the network device, one or more repetitions of a first uplink communication comprising the first set of two or more transport blocks in accordance with the first resource grant;
    receiving, from the network device, a second resource grant that schedules a second set of one or more transport blocks for a second uplink communication that at least partially overlaps with resources for one or more additional repetitions of the first uplink communication comprising the first set of two or more transport blocks; and
    selectively canceling one or more remaining repetitions of the first uplink communication based at least in part on the second resource grant providing an implicit acknowledgment of successful receipt of the set of two or more transport blocks of the first uplink communication, wherein the implicit acknowledgment is based at least in part on the second resource grant indicating a second set of HARQ process IDs, wherein each HARQ process ID of the second set of HARQ process IDs either:
        is not included in the first set of HARQ process IDs, or
        is included in the first set of HARQ process IDs and has a different new data indicator than the respective new data indicator.

2. The method of claim 1, wherein the selectively canceling comprises:
    identifying that each of the two or more transport blocks scheduled by the first resource grant are acknowledged by the network device based at least in part on the second resource grant;
    determining to cancel the one or more remaining repetitions of the first uplink communication based at least in part on the identifying; and
    transmitting one or more repetitions of the second uplink communication based at least in part on the second resource grant.

3. The method of claim 2, wherein the selectively canceling further comprises:
    determining that the one or more repetitions of the second resource grant are scheduled to be transmitted after at least a threshold time period following a first repetition of the two or more transport blocks scheduled by the first resource grant.

4. The method of claim 1, further comprising:
    receiving, from the network device, configuration information that enables acknowledgment of transport blocks based on a toggled new data indicator provided in the second resource grant.

5. The method of claim 1, further comprising:
    receiving, from the network device, configuration information that enables resource grants for multiple transport blocks, wherein cancellation of repetitions based on implicit acknowledgment of transport blocks is disabled based on the configuration information that enables resource grants for multiple transport blocks, and wherein cancellation of repetitions based on implicit acknowledgment of transport blocks is enabled based on configuration information that disables resource grants for multiple transport blocks.

6. The method of claim 1, wherein the selectively canceling comprises:
    identifying that at least a first transport block of a first plurality of transport blocks scheduled by the first resource grant is acknowledged based at least in part on the second resource grant, wherein the first plurality of transport blocks include the set of two or more transport blocks;
    determining to cancel one or more remaining repetitions of the first transport block based at least in part on the identifying; and
    transmitting one or more repetitions of the second uplink communication based at least in part on the second resource grant, wherein the second uplink communication comprises one or more repetitions of at least a second transport block of the first plurality of transport blocks that is unacknowledged by the network device.

7. The method of claim 6, further comprising:
    delivering an acknowledgment indication for the first transport block from a physical layer of a protocol stack at the UE to a higher layer of the protocol stack.

8. The method of claim 6, wherein the determining to cancel the one or more remaining repetitions of the first transport block further comprises:

determining a timing for transmitting a first repetition of the second transport block that is after at least a threshold time period following the second resource grant.

9. The method of claim 6, wherein the determining to cancel the one or more remaining repetitions of the first transport block further comprises:
determining that the second uplink communication is to be transmitted using resources that overlap with the first uplink communication.

10. The method of claim 6, wherein a timing for cancelling the one or more remaining repetitions of the first uplink communication corresponds to a time period from a first instance available for transmission of the first transport block after receiving the second resource grant to a first uplink resource allocated by the second resource grant.

11. The method of claim 6, wherein a timing for cancelling the one or more remaining repetitions of the first uplink communication corresponds to a first instance available for transmission of the second transport block based on the second resource grant.

12. The method of claim 6, wherein:
a timing for cancelling the one or more remaining repetitions of the first uplink communication corresponds to a first instance available for transmission of the first transport block after the second resource grant when successful receipt of each transport block of the first uplink communication is acknowledged, or
the timing for cancelling the one or more remaining repetitions of the first uplink communication corresponds to a first instance available for transmission of the second transport block based on the second resource grant when successful receipt of less than all transport blocks of the first uplink communication is acknowledged.

13. The method of claim 6, wherein:
a timing for cancelling the one or more remaining repetitions of the first uplink communication corresponds to a first instance available for transmission of the first transport block when successful receipt of the first transport block is acknowledged; and
the timing for cancelling the one or more remaining repetitions of the first uplink communication corresponds to a first instance available for transmission of the second transport block based on the second resource grant when successful receipt of the first transport block is unacknowledged.

14. The method of claim 6, wherein a timing for cancelling the one or more remaining repetitions of the first uplink communication corresponds to a first instance available for transmission of the second transport block after a transmission of a latest transport block of the first uplink communication for which successful receipt is unacknowledged.

15. The method of claim 1, wherein the selectively canceling one or more remaining repetitions of the first uplink communication is further determined based at least in part on whether multiple transport blocks scheduled by the first resource grant are interleaved or are non-interleaved.

16. The method of claim 1, wherein the second resource grant for the second uplink communication at least partially overlaps in time with the resources for one or more repetitions of the first uplink communication.

17. A method for wireless communication at a network device, comprising:
transmitting, to a user equipment (UE) a first resource grant for one or more repetitions of a first uplink communication to be transmitted by the UE, wherein the first resource grant schedules a first set of two or more transport blocks, the first resource grant indicating a first set of hybrid automatic repeat request (HARQ) process identifiers (IDs) associated with the first set of transport blocks, and the first resource grant indicating a respective new data indicator for each HARQ process ID of the first set of HARQ process IDs;
receiving, from the UE, one or more repetitions of the first uplink communication comprising the first set of two or more transport blocks;
selectively canceling one or more remaining repetitions of the first uplink communication based at least in part on successfully decoding at least a first transport block of the first set of two or more transport blocks of the first uplink communication; and
transmitting, to the UE, a second resource grant for a second uplink communication that at least partially overlaps with resources for one or more additional repetitions of the first uplink communication and provides an implicit acknowledgment of successful receipt of the first transport block, wherein the implicit acknowledgment is based at least in part on the second resource grant indicating a second set of HARQ process IDs, wherein each HARQ process ID of the second set of HARQ process IDs either:
is not included in the first set of HARQ process IDs, or
is included in the first set of HARQ process IDs and has a different new data indicator than the respective new data indicator.

18. The method of claim 17, wherein the second resource grant is transmitted responsive to determining that each transport block of the two or more transport blocks scheduled by the first resource grant are successfully decoded at the network device.

19. The method of claim 18, further comprising:
determining resources for a first instance of one or more repetitions of the second resource grant based at least in part on a threshold time period following a first repetition of the two or more transport blocks scheduled by the first resource grant.

20. The method of claim 17, further comprising:
transmitting, to the UE, configuration information that enables resource grants for multiple transport blocks, wherein cancellation of repetitions based on implicit acknowledgment of transport blocks is disabled based on the configuration information that enables resource grants for multiple transport blocks, and wherein cancellation of repetitions based on implicit acknowledgment of transport blocks is enabled based on configuration information that disables resource grants for multiple transport blocks.

21. The method of claim 17, further comprising:
disregarding one or more further repetitions of the first transport block when one or more of the first resource grant or the second resource grant schedules multiple transport blocks.

22. The method of claim 17, wherein the second resource grant provides an indication that the first transport block of a first plurality of transport blocks scheduled by the first resource grant has been successfully decoded, the first plurality of transport blocks include the first set of two or more transport blocks, and wherein further repetitions of the first transport block are canceled and the UE continues to transmit one or more repetitions of a second transport block of the first plurality of transport blocks that is unacknowledged by the network device.

23. The method of claim 22, further comprising:
monitoring for a first repetition of the second uplink communication in an uplink resource that is after at least a threshold time period following the second resource grant.

24. The method of claim 23, further comprising:
monitoring for a first repetition of the second uplink communication in an uplink resource that corresponds to a first instance available for transmission of the second uplink communication after the threshold time period following the second resource grant.

25. The method of claim 23, further comprising:
monitoring for a first repetition of the second uplink communication in an uplink resource that corresponds to a first instance available for transmission of the second uplink communication based on the second resource grant.

26. The method of claim 23, further comprising:
discontinuing monitoring for one or more repetitions of the first uplink communication in uplink resources starting at a first instance available for transmission of the first transport block after the second resource grant when successful receipt of each transport block of the first uplink communication is acknowledged, or
monitoring for one or more repetitions of the first uplink communication up to a first instance available for transmission of the second transport block based on the second resource grant when successful receipt of less than all transport blocks of the first uplink communication is acknowledged.

27. The method of claim 23, further comprising:
discontinuing monitoring for one or more repetitions of the first uplink communication in uplink resources starting at a first instance available for transmission of the first transport block following the second resource grant when successful receipt of the first transport block is acknowledged; and
monitoring for one or more repetitions of the first uplink communication in uplink resources up to a first instance available for transmission of the second uplink communication based on the second resource grant when successful receipt of the first transport block is unacknowledged.

28. The method of claim 23, further comprising:
monitoring for one or more repetitions of the first uplink communication up to a latest transport block of the first uplink communication for which successful receipt is unacknowledged; and
discontinuing monitoring for the one or more repetitions of the first uplink communication starting after the latest transport block of the first uplink communication for which successful receipt is unacknowledged.

29. The method of claim 17, wherein the second resource grant for the second uplink communication at least partially overlaps in time with the resources for one or more repetitions of the first uplink communication.

30. An apparatus for wireless communication at a user equipment (UE), comprising:
one or more memories storing processor-executable code; and
one or more processors coupled with the one or more memories and individually or collectively configured to, when executing the code, cause the UE to:
receive, from a network device, a first resource grant that schedules a first set of two or more transport blocks for a first uplink communication, the first resource grant indicating a first set of hybrid automatic repeat request (HARQ) process identifiers (IDs) associated with the first set of transport blocks, and the first resource grant indicating a respective new data indicator for each HARQ process ID of the first set of HARQ process IDs;
transmit, to the network device, one or more repetitions of a first uplink communication comprising the first set of two or more transport blocks in accordance with the first resource grant;
receive, from the network device, a second resource grant that schedules a second set of one or more transport blocks for a second uplink communication that at least partially overlaps with resources for one or more additional repetitions of the first uplink communication comprising the first set of two or more transport blocks; and
selectively cancel one or more remaining repetitions of the first uplink communication based at least in part on the second resource grant providing an implicit acknowledgment of successful receipt of the set of two or more transport blocks of the first uplink communication, wherein the implicit acknowledgment is based at least in part on the second resource grant indicating a second set of HARQ process IDs, wherein each HARQ process ID of the second set of HARQ process IDs either:
is not included in the first set of HARQ process IDs, or
is included in the first set of HARQ process IDs and has a different new data indicator than the respective new data indicator.

31. The apparatus of claim 30, wherein the one or more processors are individually or collectively configured to, when executing the code, cause the UE to:
identify that each of two or more transport blocks scheduled by the first resource grant are acknowledged by the network device based at least in part on the second resource grant;
determine to cancel the one or more remaining repetitions of the first uplink communication based at least in part on the identifying; and
transmit one or more repetitions of the second uplink communication based at least in part on the second resource grant.

32. The apparatus of claim 31, wherein the one or more processors are individually or collectively configured to, when executing the code, cause the UE to:
determine that the one or more repetitions of the second resource grant are scheduled to be transmitted after at least a threshold time period following a first repetition of the two or more transport blocks scheduled by the first resource grant.

33. The apparatus of claim 30, wherein the one or more processors are individually or collectively configured to, when executing the code, cause the UE to:
receive, from the network device, configuration information that enables acknowledgment of transport blocks based on a toggled new data indicator provided in the second resource grant.

34. The apparatus of claim 30, wherein the second resource grant for the second uplink communication at least partially overlaps in time with the resources for one or more repetitions of the first uplink communication.

35. The apparatus of claim 30, wherein the one or more processors are individually or collectively configured to, when executing the code, cause the UE to:
receive, from the network device, configuration information that enables resource grants for multiple transport blocks, wherein cancellation of repetitions based on implicit acknowledgment of transport blocks is disabled based on the configuration information that enables resource grants for multiple transport blocks, and wherein cancellation of repetitions based on implicit acknowledgment of transport blocks is enabled based on configuration information that disables resource grants for multiple transport blocks.

36. The apparatus of claim 30, wherein the one or more processors are individually or collectively configured to, when executing the code, cause the UE to:
identify that at least a first transport block of a first plurality of transport blocks scheduled by the first resource grant is acknowledged based at least in part on the second resource grant, the first plurality of transport blocks include the set of two or more transport blocks;
determine to cancel one or more remaining repetitions of the first transport block based at least in part on the identifying;
transmit one or more repetitions of the second uplink communication based at least in part on the second resource grant, wherein the second uplink communication comprises one or more repetitions of at least a second transport block of the first plurality of transport blocks that is unacknowledged by the network device.

37. The apparatus of claim 36, wherein the one or more processors are individually or collectively configured to, when executing the code, cause the UE to:
deliver an acknowledgment indication for the first transport block from a physical layer of a protocol stack at the UE to a higher layer of the protocol stack.

38. An apparatus for wireless communication at a network device, comprising:
one or more memories storing processor-executable code; and
one or more processors coupled with the one or more memories and individually or collectively configured to, when executing the code, cause the network device to:
transmit, to a user equipment (UE) a first resource grant for one or more repetitions of a first uplink communication to be transmitted by the UE, wherein the first resource grant schedules a first set of two or more transport blocks, the first resource grant indicating a first set of hybrid automatic repeat request (HARQ) process identifiers (IDs) associated with the first set of two or more transport blocks, and the first resource grant indicating a respective new data indicator for each HARQ process ID of the first set of HARQ process IDs;
receive, from the UE, one or more repetitions of the first uplink communication comprising the first set of two or more transport blocks;
selectively canceling one or more remaining repetitions of the first uplink communication based at least in part on successfully decoding at least a first transport block of the first set of two or more transport blocks of the first uplink communication; and
transmit, to the UE, a second resource grant for a second uplink communication that at least partially overlaps with resources for one or more repetitions of the first uplink communication and provides an implicit acknowledgment of successful receipt of the first transport block, wherein the implicit acknowledgment is based at least in part on the second resource grant indicating a second set of HARQ process IDs, wherein each HARQ process ID of the second set of HARQ process IDs either:
is not included in the first set of HARQ process IDs, or
is included in the first set of HARQ process IDs and has a different new data indicator than the respective new data indicator.

39. The apparatus of claim 38, wherein the second resource grant is transmitted responsive to determining that each transport block of the two or more transport blocks scheduled by the first resource grant are successfully decoded at the network device.

40. The apparatus of claim 39, wherein the one or more processors are individually or collectively configured to, when executing the code, cause the network device to:
determine resources for a first instance of one or more repetitions of the second resource grant based at least in part on a threshold time period following a first repetition of the two or more transport blocks scheduled by the first resource grant.

41. The apparatus of claim 38, wherein the one or more processors are individually or collectively configured to, when executing the code, cause the network device to:
transmit, to the UE, configuration information that enables resource grants for multiple transport blocks, wherein cancellation of repetitions based on implicit acknowledgment of transport blocks is disabled based on the configuration information that enables resource grants for multiple transport blocks, and wherein cancellation of repetitions based on implicit acknowledgment of transport blocks is enabled based on configuration information that disables resource grants for multiple transport blocks.

42. The apparatus of claim 38, wherein the one or more processors are individually or collectively configured to, when executing the code, cause the network device to:
monitor for the second uplink communication using at least a portion of resources of the one or more remaining repetitions of the first uplink communication based at least in part on the first resource grant and the second resource grant each scheduling a single transport block.

43. The apparatus of claim 38, wherein the second resource grant provides an indication that the first transport block of a first plurality of transport blocks scheduled by the first resource grant has been successfully decoded, the first plurality of transport blocks include the first set of two or more transport blocks, and wherein further repetitions of the first transport block are canceled and the UE continues to transmit one or more repetitions of a second transport block of the first plurality of transport blocks that is unacknowledged by the network device.

44. The apparatus of claim 43, wherein the one or more processors are individually or collectively configured to, when executing the code, cause the network device to:
monitor for a first repetition of the second uplink communication in an uplink resource that is after at least a threshold time period following the second resource grant.

* * * * *